(12) United States Patent
Li

(10) Patent No.: US 9,985,827 B2
(45) Date of Patent: May 29, 2018

(54) AUTOMATED GENERATION OF DEPLOYMENT WORKFLOWS FOR CLOUD PLATFORMS BASED ON LOGICAL STACKS

(71) Applicant: Futurewei Technologies, Inc., Plano, TX (US)

(72) Inventor: Li Li, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 189 days.

(21) Appl. No.: 15/163,225

(22) Filed: May 24, 2016

(65) Prior Publication Data

US 2017/0346683 A1 Nov. 30, 2017

(51) Int. Cl.
*H04L 12/24* (2006.01)
*G06F 17/30* (2006.01)
*H04L 29/08* (2006.01)

(52) U.S. Cl.
CPC .... *H04L 41/0803* (2013.01); *G06F 17/30958* (2013.01); *H04L 67/10* (2013.01)

(58) Field of Classification Search
USPC ......................................... 709/223, 220, 226
See application file for complete search history.

(56) References Cited

U.S. PATENT DOCUMENTS 9,678,748 B2 * 6/2017 Sivaramamurthy ...... G06F 9/00
2011/0295999 A1 12/2011 Ferris et al.
2013/0054863 A1 * 2/2013 Imes .................. H04L 12/2827
710/304
2013/0074064 A1 3/2013 Das et al.
2015/0074281 A1 3/2015 Vendrow
2015/0169469 A1 * 6/2015 Sivaramamurthy ...... G06F 9/00
711/133

FOREIGN PATENT DOCUMENTS

CN 103078952 A 5/2013

OTHER PUBLICATIONS

"A Brief Introduction to Bigraphs," http:www.itu/dk/research/pls/wiki/index.php/A_Brief_Introduction_To_Bigraphs, Feb. 6, 2008, 3 pages.
"Cloud Foundry Components," CloudFoundry: https://docs.cloudfoundry.org/concepts/architecture; May 9, 2016, 3 pages.

(Continued)

*Primary Examiner* — Jude Jean Gilles
(74) *Attorney, Agent, or Firm* — Conley Rose, P.C.

(57) ABSTRACT

A method implemented in a data center management node including obtaining, from memory, a physical stack describing a configuration of platform components across multiple operating platforms on a data center infrastructure, generating, by a processor, a graph describing correlations between the operating platforms and the data center infrastructure based on a platform library, wherein the platform library describes configurations of the platform components for each of the operating platforms separately, generating, by the processor, one or more logical stacks based on the graph, wherein the one or more logical stacks indicate deployable configurations of the operating platforms without depicting the platform components, and representing the logic stack to a user.

20 Claims, 16 Drawing Sheets

(56) References Cited

OTHER PUBLICATIONS

"Architecture Overview," Cloudify: http://getcloudify.org/guide/3.0/overview-architecture.html, 2016, 5 pages.
"Topology and Orchestration Specification for Cloud Applications Version 1.0," OASIS Standard, http://docs.oasis-open.org/tosca/TOSCA-Simple-Profile-YAML/v1.0/csprd01/TOSCA-Simple-YAML-v1.0-csprd01.html, Nov. 25, 2013, 44 pages.
Milner, "Bigraphical Reactive Systems: Basic Theory," Technical Report, No. 523, UCAM-CL-TR-523, ISSN 1476-2986, University of Cambridge, Computer Laboratory, Sep. 2001, 87 pages.
Spatzier, "OASIS TOSCA . . . and How It Could Fit Into OpenStack Heat," OpenStack Design Summit, Apr. 15, 2013, https:wiki.openstack.org/w/images/a/a1/TOSCA_in_Heat-20130415.pdf, 16 pages.
"TOSCA Simple Profile in YAML Version 1.0," OASIS, Committee Specification Draft 05/ Public Review Draft 02, http:docs.oasis-open-org/tosca/TOSCA-Simple-Profile-YAML/v1.0/csprd02/TOSCA-Simple-Profile-YAML-v1.0-csprd02.pdf, Feb. 4, 2016, 267 pages.
"Web Services Business Process Execution Language Version 2.0," OASIS Standard, http://docs.oasis-open-org/wsbpel/2.0/OS/wsbpel-v2.0-OS.pdf; Apr. 11, 2007, 264 pages.
Machine Translation and Abstract of Chinese Publication No. CN103078952, dated May 1, 2013, 6 pages.
Foreign Communication From a Counterpart Application, PCT Application No. PCT/CN2017/085144, English Translation of International Search Report dated Jul. 27, 2017, 7 pages.
Foreign Communication From a Counterpart Application, PCT Application No. PCT/CN2017/085144, English Translation of Written Opinion dated Jul. 27, 2017, 5 pages.

* cited by examiner

AUTOMATED GENERATION OF DEPLOYMENT WORKFLOWS FOR CLOUD PLATFORMS BASED ON LOGICAL STACKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing is a model for the delivery of hosted services, which may then be made available to users through, for example, the Internet. Cloud computing enables ubiquitous, convenient, on-demand network access to a shared pool of configurable computing resources that can be provisioned and employed with minimal management effort or service provider interaction. By employing cloud computing resources, provisioners may deploy and manage emulations of particular computer systems through a network, which provide convenient access to the computing resources.

SUMMARY

Cloud platforms are able to provide services to users through three different models such as Infrastructure as a Service (IaaS), Platform as a Service (PaaS), and Software as a Service (SaaS). The lines between these models are becoming less and less distinct. Therefore, it is difficult to efficiently deploy the three models over a large datacenter infrastructure. One of the problems with the prior art is that users are only able to specify target platforms at a component level, which is much more complex than at a platform level. Users have to manually construct configuration scripts if they are not available, and the scripts cannot be shared among the different users. In addition, users have to wait for an extended period of time to know the result of a platform deployment. Moreover, users do not know the deployment workflows and, as such, debugging or transporting the platform to a different cloud is difficult. To resolve these and other problems, and as will be more fully explained below, deployment workflows based on logical stacks are automatically generated.

In one embodiment, the disclosure includes a method implemented in a data center management node including obtaining, from memory, a physical stack describing a configuration of platform components across multiple operating platforms on a data center infrastructure, generating, by a processor, a graph describing correlations between the operating platforms and the data center infrastructure based on a platform library, wherein the platform library describes configurations of the platform components for each of the operating platforms separately, generating, by the processor, one or more logical stacks based on the graph, wherein the one or more logical stacks indicate deployable configurations of the operating platforms without depicting the platform components, and representing the logic stack to a user.

In an embodiment, generating the base-stem graph comprises obtaining platform configurations for platforms corresponding to platform components in the physical stack, generating, for the base-stem graph, a platform node corresponding to a platform whose components are in the physical stack, and returning the base-stem graph without returning corresponding platform components. In an embodiment, generating the base-stem graph further comprises linking platform nodes based on the links between the platform components in the physical stack. In an embodiment, the method includes obtaining workflows describing deployment sequences for the plurality of operating platforms, obtaining platform configurations from the platform library, the platform configurations describing the components and their relations of each of the platforms, extracting micro-workflows for the platforms based on the workflows and the platform configurations, wherein the micro-workflows describe deployment sequences for initiating components of a first of the platforms with respect to components of a second of the platforms, generating the platform library based on the micro-workflows, and storing the platform library in memory. In an embodiment, extracting the micro-workflows includes extracting a first workflow to initiate a first platform component on the data center infrastructure, extracting a second workflow to initiate a second platform component on the data center infrastructure, extracting a third workflow to link the first platform component to the second platform component, and combining the first workflow, second workflow, and third workflow into at least one of the micro-workflows. In an embodiment, the second workflow is extracted by applying a disjoint removal rule, and the disjoint removal rule requires removal of workflow steps related to disjoint platforms. In an embodiment, the third workflow is extracted by applying a context removal rule, and the context removal rule requires employing each workflow step associated with the first platform and the second platform and not related to a specified context. In an embodiment, the method includes receiving, via a receiver, a selection from a user requesting deployment of a multi-platform operating environment described by the logical stack, and generating a workflow procedure to deploy components on the data center infrastructure for each platform described in the logical stack. In an embodiment, the method includes transmitting, via a transmitter, the workflow procedure to the user prior to executing the workflow procedure in order to inform a user of unavailable workflows for the logical stack, where the unavailable workflows are determined when no path is found in the platform library between the data center infrastructure and a determined platform component. In an embodiment, generating the workflow procedure includes determining the platforms described by the logical stack, searching a platform graph to determine shortest workflows required for deploying the platforms on each other in the logical stack, and searching the platform graph for shortest workflows required for deploying each platform on the data center infrastructure. In an embodiment, each platform employs a master component and at least one slave component. In an embodiment, the platforms comprise Kubernetes and Mesos platforms, and the graph comprises a base-stem graph.

In another embodiment, the disclosure includes a method including receiving, via a receiver, a selection from a user requesting deployment of a multi-platform operating environment described by a logical stack, generating, via a processor, a workflow procedure to deploy platform components on a data center infrastructure for each platform described in the logical stack by determining the platforms described by the logical stack, searching a platform graph to determine shortest workflows required for deploying the platforms on each other in the logical stack, and searching the platform graph for shortest workflows required for deploying the platforms on the data center infrastructure, and transmitting, via a transmitter, the workflow procedure to the user.

In an embodiment, extracting micro-workflows includes extracting a first workflow to initiate a first platform component on the data center infrastructure, extracting a second workflow to initiate a second platform component on the data center infrastructure, extracting a third workflow to link the first platform component to the second platform component, and combining the first workflow, second workflow, and third workflow into at least one of the micro-workflows. In an embodiment, the second workflow is extracted by applying a disjoint removal rule, and wherein the disjoint removal rule requires removal of workflow steps related to disjoint platforms. In an embodiment, the third workflow is extracted by applying a context removal rule, and the context removal rule requires employing each workflow step associated with the first platform and the second platform and not related to a specified context.

In another embodiment, the disclosure includes a method including receiving, via a receiver, a selection from a user requesting deployment of a multi-platform operating environment described by a logical stack, generating, via a processor, a workflow procedure to deploy platform components on a data center infrastructure for each platform described in the logical stack by determining the platforms described by the logical stack, searching a platform graph to determine shortest workflows required for deploying the platforms on each other in the logical stack, and searching the platform graph for shortest workflows required for deploying the platforms on the data center infrastructure, and transmitting, via a transmitter, the workflow procedure to the user.

In an embodiment, the method includes transmitting, via a transmitter, the workflow procedure to the user prior to executing the workflow procedure in order to inform a user of unavailable workflows for the logical stack, where the unavailable workflows are determined when no path is found in the platform graph between the data center infrastructure and a determined platform component. In an embodiment, each platform employs a master component and at least one slave component. In an embodiment, the platforms comprise Kubernetes and Mesos platforms.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
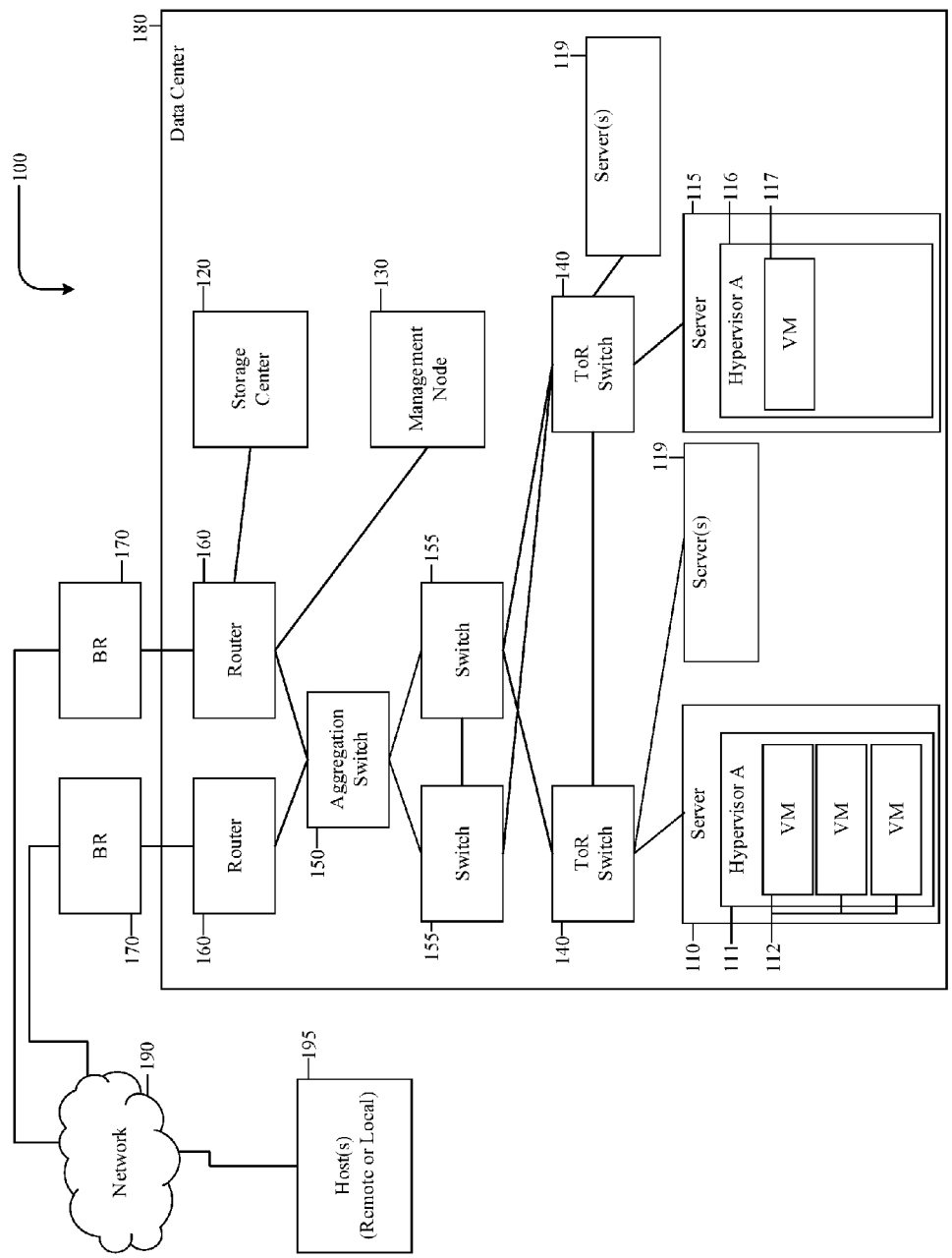
FIG. 1 is a schematic diagram of an embodiment of a data center network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The cloud, cloud computing, or cloud services may refer to a group of servers, storage elements, computers, laptops, cell phones, and/or any other types of network devices connected together by an Internet protocol (IP) network in order to share network resources. With a cloud computing solution, computing capabilities or resources are provisioned and made available over a network. Such computing capabilities may be elastically provisioned and released, in some cases automatically, to scale rapidly outward and inward based on demand. A provider of cloud computing capabilities may pool computing resources to serve multiple provisioners (e.g., an entity requesting services from the provider) using a multi-tenant model where fine-grained resources may be dynamically assigned to a provisioner specified implementation and reassigned to other implementations according to consumer demand. Furthermore, a provider may automatically control and optimize resource use by leveraging a metering capability at some level of abstraction appropriate to the type of resource (e.g., storage, processing, bandwidth, and active user accounts). A cloud computing solution provides requested resources without requiring provisioners to establish a computing infrastructure in order to service consumers. Provisioners may provision the resources in a specified implementation by providing various specification and artifacts defining a requested solution. Provisioners have little control or knowledge over the exact location of the provided resources, but may be able to specify location at a higher level of abstraction (e.g., country, state, or data center).

Cloud computing resources may be provided according to one or more various models. Such models include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS includes a service provider licensing software as a service on demand. The service provider may host the software, or may deploy the software to a provisioner for a given period of time.

Regardless of the employed model, one of the biggest challenges for deploying such cloud computing resources is how to efficiently deploy large scale cloud-based systems over a data center infrastructure as provisioners specify target platforms and/or resources at a component level, which is much more complex than at a platform level. As such, provisioners may be required to manually construct configuration scripts to deploy various platforms. A platform is a cloud-based software system with at least one component (e.g., program or process). Further, the configuration scripts are not shared among provisioners. Additionally, results of platform deployment take a considerable amount of time to obtain, are difficult to debug, and are laborious to transport to a different cloud, thus wasting resources.

Disclosed herein are various mechanisms for automated generation of deployment workflows (e.g., coherent workflows) for cloud computing resources based on logical stacks. As discussed below, a cloud-based system (e.g., implemented by a management node) may transform a deployment model (e.g., physical stack) to a corresponding logical stack. A deployment model/physical stack represents a specification for a platform to be deployed via cloud-based resources (e.g., data center infrastructure) and provides a detailed definition of requested platform components and the relationships between such components. A logical stack is an abstraction of the physical stack and describes correlations between platforms in a multi-platform/layered platform configuration. The cloud system employs stored workflows (e.g., scripts) for available platforms and a platform library with platform configurations to extract micro-workflows. The micro-workflows describe correlations between layered platform components operating in different platforms (e.g., cross-platform dependency) and correlations between the platform components and data center infrastructure. The cloud system then generates a platform graph describing correlations between a plurality of platform components across a plurality of layered platforms and describing correlations between such components and data center infrastructure (e.g., corresponding virtual machines). The cloud system employs the platform graph to generate base-stem graphs describing platform relationships (e.g., without the corresponding components) for layered platform deployments. The base-stem graphs are then represented to a user as logical stacks, allowing the user to select an appropriate logical stack without needing to be aware of the cross-platform dependencies of each of the components. Upon selection by a user, the cloud system may generate an optimized workflow for a selected logical stack. The optimized workflow is generated by determining the platform component dependencies and infrastructure requirements for the selected logical stack based on the platform graph. The optimized workflow can be forwarded to the user before execution so that the user can verify whether all workflows are available for all platforms prior to execution. Upon approval by the user, the optimized workflow is executed to set up all platform components. In this way, a plurality of layered platforms can be set up without requiring the user to specify the components needed and/or without requiring the user to input workflows for each component/platform.

FIG. 1 is a schematic diagram of an embodiment of a data center network 100. Data center network 100 comprises a data center 180, a network 190, and a host(s) 195, which are employed to implement a cloud-based solution system. Network 190 provides the host(s) 195 with access to data center 180. The data center 180 comprises servers 110, 115, and/or 119, which operate hypervisors 111 and/or 116. The hypervisors 111 and/or 116 create and/or operate virtual machines (VMs) 112 and/or 117. The data center 180 also comprises a management node 130, which is connected to the servers 110, 115, and/or 119 as shown in FIG. 1 or in any other suitable arrangement as would be appreciated by one skilled in the art. The hypervisors 111 and/or 116 register VMs 112 and/or 117 with the management node 130. The hypervisors 111 and/or 116 move VMs 112 and/or 117 to other hypervisors and/or servers. The hypervisors 111 and/or 116 communicate with management node 130 to facilitate the transmission of VMs 112 and/or 117 as well as perform associated host routing of active network traffic to VMs 112 and/or 117.

The data center 180 is a facility used to house computer systems and associated components, such as telecommunications and storage systems. A data center 180 includes redundant or backup power supplies, redundant data communications connections, environmental controls (e.g., air conditioning, fire suppression), security devices, and so on. Data center 180 comprises a network to interconnect servers (e.g., servers 110, 115, and/or 119) and storage devices (e.g., storage center 120), manage communications, and provide host 195 (e.g., remote hosts and/or local hosts) access to resources of the data center 180 via border routers (BRs) 170. Host 195 may be any device configured to request a service (e.g., a process, storage, etc.) from a server (e.g., servers 110, 115, and/or 119) via network 190. Host 195 may be a remote host, which may be positioned outside of the data center 180, or a local host, which may be positioned inside the data center 180.

A data center 180 may house a plurality of servers, such as servers 110, 115, and 119. A server 110, 115, and 119 is any device configured to respond to requests and/or provide services, such as cloud-based solution servicers, or respond to hosts, such as host 195. A server provides services via VMs, such as VMs 112 and/or 117. A VM 112 and/or 117 is an emulation of a physical machine that is configured to respond to requests in a predetermined manner. For example, VM 112 is able to run a single program and/or process and VM 117 is able to act as a system platform such as an operating system (OS). VM 112 and/or 117 receive requests from hosts, such as host 195, provide data storage and/or retrieval, execute processes, and/or transmit data (e.g., process results) to the hosts. VMs 112 and/or 117 are managed by hypervisors 111 and/or 116. A VM comprises a plurality of virtual interfaces, which may be supported by a hypervisor and may be used to communicate with hosts, such as host 195. Internet protocol (IP) address(es) are associated with a VM, a VM interface, and/or a plurality of a VM's interfaces.

A hypervisor 111 and/or 116 may be a hardware, software, and/or firmware VM management entity, which may operate on a server 110, 115, and/or 119, and may act as a virtual operating platform to a VM (e.g., VMs 112 and/or 117.) The hypervisor 111 and/or 116 may create, manage, and transfer VMs to other hypervisor(s). Servers 110, 115, and/or 119 may be positioned in racks. Each rack may comprise a top-of-rack (ToR) switch 140, which is a switch used to connect the servers in a data center 180 to the data center network 100. The ToR switches 140 are connected to each server in a rack as well as to other ToR switches 140 to allow communication between racks. Racks may be positioned in rows. The ToR switches 140 may be connected to other switches 155, such as end-of-row (EoR) switches, which allow communication between rows. Switches 155 may be connected to an aggregation switch 150. The aggregation switch 150 aggregates communications between the servers for interaction with the data center's 180 core network. The aggregation switch 150 may be connected to routers 160 positioned inside the data center 180 core network. Communications enter and leave the data center 180 via BR 170. A BR may be the positioned at the border of the network 100 and provide connectivity between VMs and remote hosts communicating with the VMs (e.g., via the Internet).

In an embodiment, the data center 180 comprises a storage center 120. The storage center 120 includes a plurality of storage devices configured to store and retrieve data based on commands from the servers 110, 115 and/or 119, VMs 112 and/or 117, hypervisors 111 and/or 116, and/or hosts 195. The storage center 120 may be connected to the data center 180 (e.g., via router 160) using a high speed connection such as an optical fiber channel.

The data center 180 may also comprise a management node 130. The management node 130 stores data related to the VM mobility and assists and/or manages VM mobility in conjunction with the hypervisors 111 and/or 116. The management node 130 comprises a binding cache, which includes a binding cache entry for each VM in the data center 180 and/or VMs that have been moved outside of the data center (e.g., moved to another hypervisor in another data center.) The binding cache comprises the IP address of a VM and/or VMs active interfaces, a media access control (MAC) address of the VM, a VM identifier, and/or a proxy care-of-address (COA) for a VM. As such, the management node 130 comprises data center infrastructure information sufficient to map platform components to infrastructure components.

Figure 2:
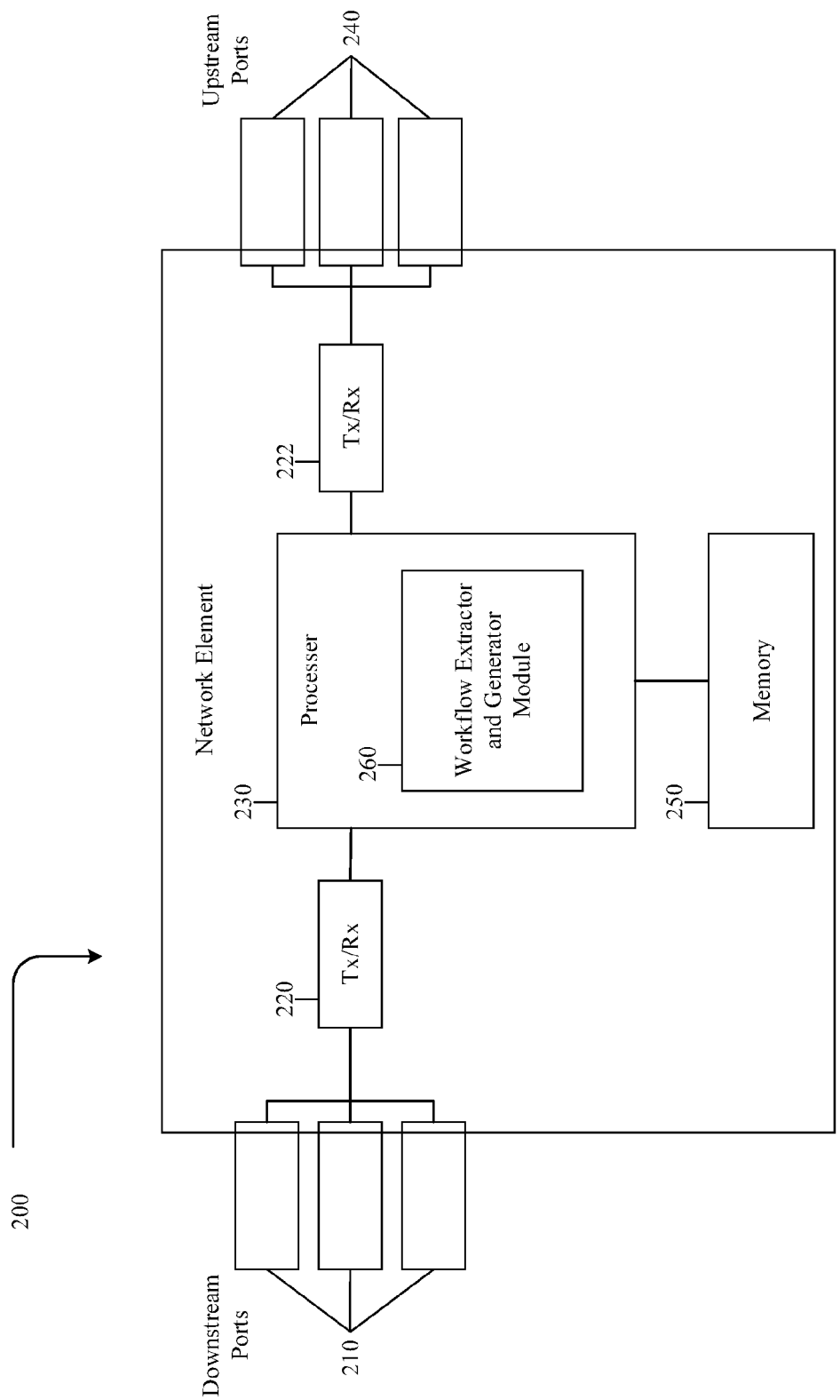
FIG. 2 is a schematic diagram of an embodiment of a Network Element (NE) configured as a node within a data center, which may be employed to provide a cloud-based solution system.

FIG. 2 is a schematic diagram of an embodiment of an NE 200. The NE 200 may operate as a server, such as server 110, 115, and/or 119, a management node 130, and/or a storage center 120 within a data center, such as data center 180, which may be employed to provide a cloud-based solution system. In some embodiments, NE 200 may be employed to implement any node in data center network 100. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network (e.g., a switch, router, bridge, server, a client, etc.).

As shown in FIG. 2, the NE 200 comprises transceivers (Tx/Rx) 220 and 222, which are transmitters, receivers, or combinations thereof A Tx/Rx 220 is coupled to a plurality of downstream ports 210 (e.g., downstream interfaces) for transmitting and/or receiving packets from other nodes and a Tx/Rx 222 coupled to a plurality of upstream ports 240 (e.g., upstream interfaces) for transmitting and/or receiving packets from other nodes, respectively. Downstream ports 220 and/or upstream ports 240 contain electrical and/or optical transmitting and/or receiving components. A processing unit 230 is coupled to the Tx/Rxs 220 and 222 to process the packets and/or determine which nodes to send packets to. The processing unit 230 may include one or more multi-core processors and/or be coupled to a memory component 250, which function as data stores, buffers, Random Access Memory (RAM), Read Only Memory (ROM), etc. Processing unit 230 may be implemented as a general processing unit or may be part of one or more application specific integrated circuits (ASICs) and/or digital signal processors (DSPs). Processing unit 230 comprises a Workflow Extractor and Generator Module 260. The Workflow Extractor and Generator Module 260 implements at least some of the methods discussed herein, such as methods 1100, 1400, 1500, and 1600 described below, in order to apply the rules, workflows, and/or data structures discussed herein. In some embodiments, Workflow Extractor and Generator Module 260 is implemented as instructions stored in memory component 250, which are executed by processing unit 230, or implemented in part in the processing unit 230 and in part in the memory component 250, for example a computer program product stored in a non-transitory memory that comprises instructions that are implemented by the processing unit 230. In some embodiments, Workflow Extractor and Generator Module 260 is implemented on separate NEs.

It is understood that by programming and/or loading executable instructions onto the NE 200, at least one of the processing unit 230, Workflow Extractor and Generator Module 260, Tx/Rxs 220 and 222, memory component 250, downstream ports 210, and/or upstream ports 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
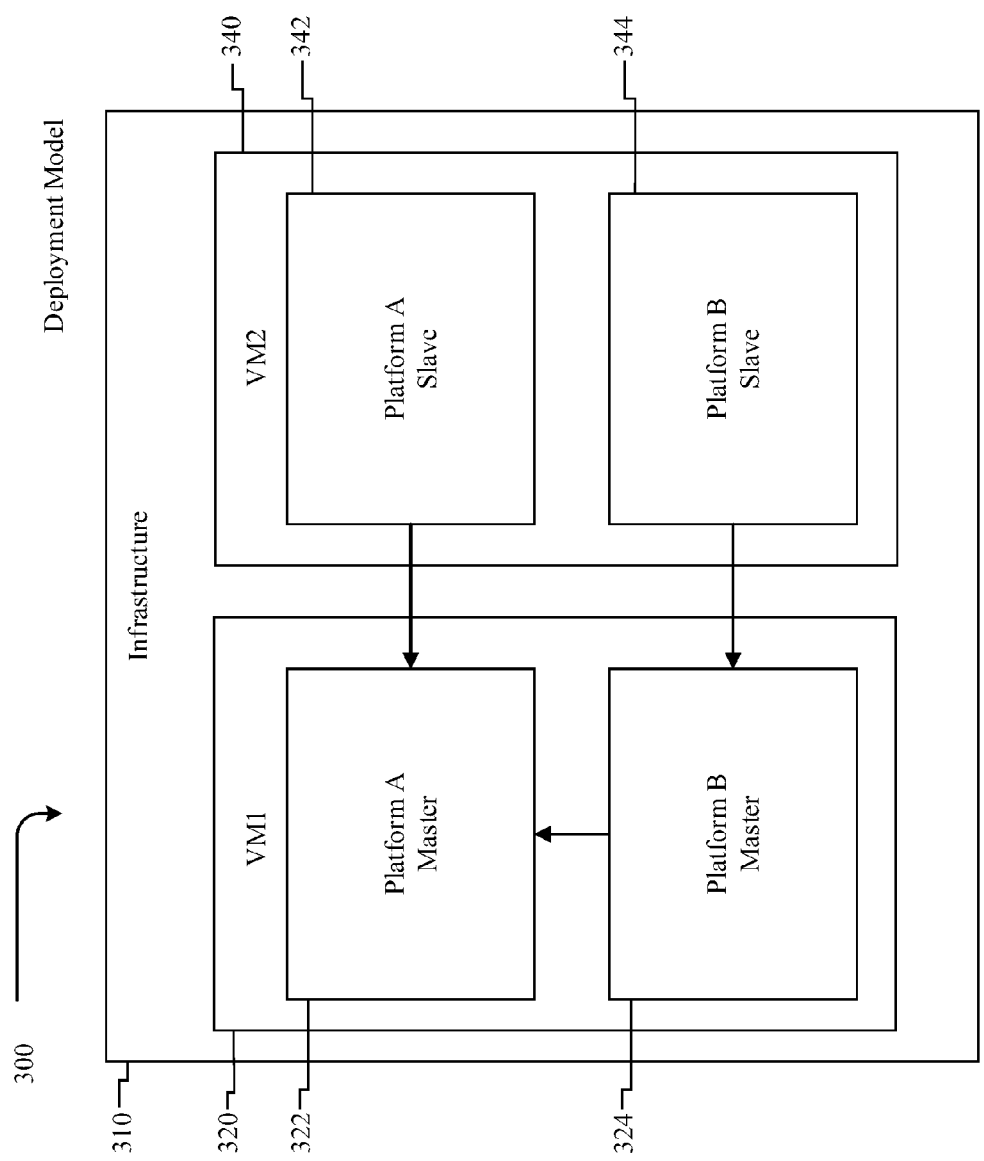
FIG. 3 is a schematic diagram of an example embodiment of a deployment model that is a platform-level abstraction representing cloud computing resources provisioned for a cloud computing system.

FIG. 3 is a schematic diagram of an example embodiment of a deployment model 300 (e.g., platform stack). The deployment model 300 is a platform-level abstraction representing cloud computing resources provisioned for a cloud computing system, such a data center infrastructure of network 100. Deployment model 300 comprises infrastructure component 310, VM components VM1 320 and VM2 340, Platform A master component 322, Platform A slave component 342, Platform B master component 324, and Platform B slave component B 344. Deployment model 300 defines an infrastructure component as comprising VM components 320 and 340. Each VM component represents a VM resource within a data center, such as VMs 112 and/or 117. Deployment model 300 further allows each VM component 320, 340 to operate Platform master A component 322, Platform A slave component 342, platform B master component 324, Platform B slave component 344, or combinations thereof. Each platform component represents a supported platform (e.g., operating service/environment) within a cloud-based solution system. Deployment model 300 is provided as an example deployment model, as a deployment model may include any number of cloud-based platforms and resources provisioned for a cloud base solution.

Within VM1 component 320, Platform A master component 322 represents a master or controller component for Platform A. Likewise, Platform B master component 324 represents a master or controller component for Platform B. VM1 component 320 comprising Platform A master component 322 and Platform B master component 324 indicates that these platforms are hosted on VM1 component 320. The edges (e.g., arrows) from Platform B master component 324 to Platform A master component 322 indicate that Platform B master component 324 is dependent upon (e.g., installed on, hosted on, configured on, connected to, layered, etc.) Platform A master component 322.

Within VM2 component 340, Platform A slave component 342 represents a slave or subordinate component for Platform A. Likewise, Platform B slave component 344 represents a slave or subordinate component for Platform B. VM2 component 340 comprising Platform A slave component 342 and Platform B slave component 344 indicates that these platforms are hosted on VM2 component 340. The edge from Platform A slave component 342 to Platform A master component 322 indicates that Platform A slave component 342 is subordinate to, and hence dependent upon, Platform A master component 322. The edge between Platform B slave component 344 and Platform B master component 324 indicates that Platform B slave component 344 is subordinate to, and hence dependent upon, Platform B master component 324. Deployment model 300 is therefore easily scalable. So long as each platform comprises a master component, any number of slave components can be added and/or controlled by the corresponding master component. For a platform comprising a slave component, a master component is also used. When components with edges are deployed, the corresponding layered platforms are also deployed.

Figure 4:
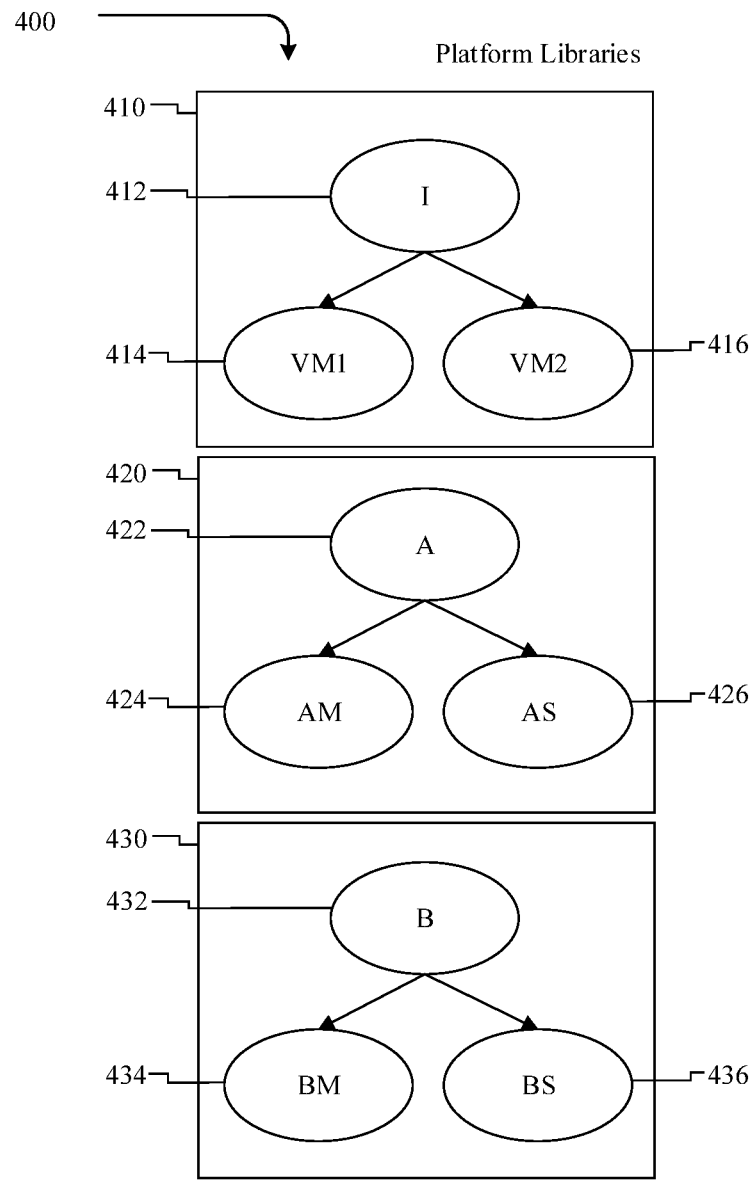
FIG. 4 is a schematic diagram of example embodiments of platform libraries for supported platforms within a cloud-based solution system.

FIG. 4 is a schematic diagram of example embodiments of platform libraries 400 for supported platforms within a cloud-based solution system. The platform libraries 400 describe configurations of the platform components for each of the operating platforms separately. Platform relationships are derived from their component relationships based on the deployment model of FIG. 3 and the platform libraries 400 of FIG. 4. A platform library represents a minimal configuration for the corresponding platform (e.g., the minimal number of components necessary for the platform's function). Example platform libraries 400 include library 410, library 420, and library 430. A platform library is defined by a vendor of the corresponding platform or a system administrator. A platform library has at least one component as a base-line minimum for a corresponding platform. A platform library contains the minimal system configuration for a distributed platform that has more than one component as a base-line minimum (e.g., a master component and a slave component M/S). Platform libraries 400 are provided as examples of a platform library and may include any number components that represent a minimal configuration of a corresponding platform.

Platform library 410 represents an infrastructure resource provided via a cloud-based solution system (e.g., in a data center network 100). Platform library 410 comprises nodes 412, 414, and 416, which represent the infrastructure resource as provided by VM1 and VM2 (e.g., VMs 112/117), respectively. VM1 node 414 and VM2 node 416 along with the edges (e.g., arrows) from infrastructure resource node 412 indicate that the infrastructure resource uses two VM components to function in an embodiment.

Platform library 420 represents an A-type Platform provided via the cloud-based solution system, for example a Mesos platform. Platform library 420 comprises nodes 422, 424, and 426, which represent a Platform A, a Platform A master component, and a Platform A slave component, respectively. Master A Platform node 424 and Platform A slave node 426 along with the edges from Platform A node 422 indicate that the Platform A uses one master and one slave component to function in an embodiment. Mesos (a.k.a., Apache Mesos) is an open-source cluster manager. Mesos was developed at the University of California, Berkeley. Mesos provides efficient resource isolation and sharing across distributed applications, or frameworks. Mesos enables resource sharing in a fine-grained manner, improving cluster utilization.

Platform library 430 represents a B-type platform provided via the cloud-based solution system, such as a Kubernetes platform. Platform library 430 comprises nodes 432, 434, and 436, which represent a Platform B, a Platform B master component, and a Platform B slave component, respectively. Master B Platform node 434 and slave B Platform node 436 along with the edges from B Platform node 432 indicate that B Platform uses one master and one slave component to function in an embodiment. Kubernetes is an open source container cluster manager. Kubernetes was originally designed by Google, Inc., and donated to the Cloud Native Computing Foundation. Kubernetes aims to provide a platform for automating deployment, scaling, and operations of application containers across clusters of hosts.

Figure 5:
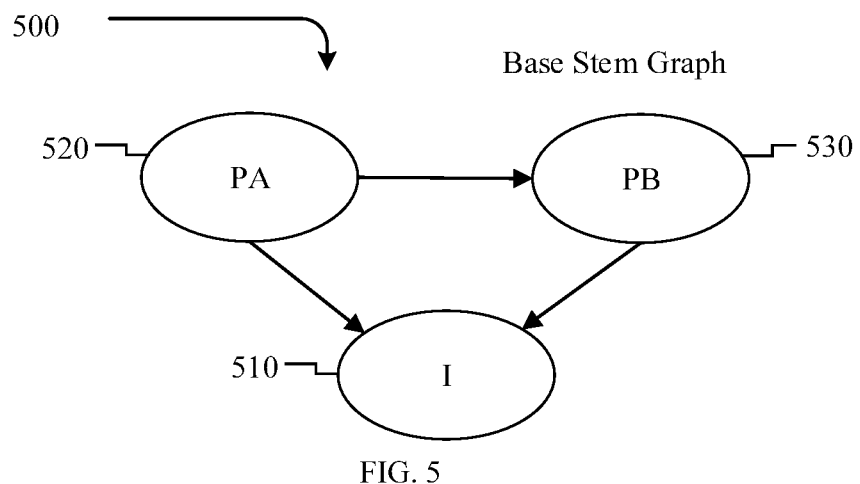
FIG. 5 is a schematic diagram of an example embodiment of a base-stem graph representing supported platforms within a cloud-based solution system.

FIG. 5 is a schematic diagram of an example embodiment of a base-stem graph 500, which represents supported platforms within a cloud-based solution system. The base-stem graph of FIG. 5 is generated based on the physical stack of FIG. 3 and the platform libraries 400 of FIG. 4. A base-stem graph is a directed graph whose nodes represent the platforms and edges that define the logical layering of the platforms. Base-stem graph 500 comprises nodes 510, 520, and 530 representing an infrastructure resource (e.g., corresponding to infrastructure node 412 in FIG. 4 and infrastructure component 310 in FIG. 3), an A platform (e.g., corresponding to node 422 in FIG. 4 and master and slave components 322, 342 in FIG. 3), and a B platform (e.g., corresponding to node 432 in FIG. 4 and master and slave components 324, 344 in FIG. 3) supported within a cloud-based solution system. The edges (e.g., arrows) between the nodes represent the layering of the resources or platforms. The edge between B platform node 530 and A platform node 520 points to B platform node 530 thus indicating that B platform is supported by (e.g., hosted on, installed on, etc.) A platform. Additionally, both edges between B platform node 530 and A platform node 520 to infrastructure node 510 point to infrastructure node 510 thus indicating that A platform and B platform are supported by the infrastructure resource. The base-stem graph 500 shows platform dependencies without needing to depict every component dependency. As such, base-stem graph 500 simplifies the overall deployment by only showing the infrastructure and platforms needed to deploy a system without depicting the corresponding components.

Figure 6:
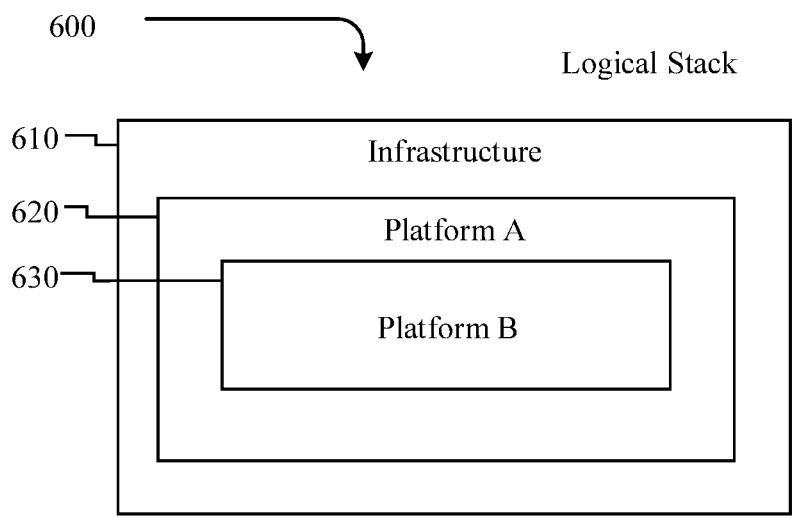
FIG. 6 is a schematic diagram of an example embodiment of a logical stack representing supported platforms within a cloud-based solution system as a platform-level abstraction.

FIG. 6 is a schematic diagram of an example embodiment of a logical stack 600 representing supported platforms within a cloud-based solution system as a platform-level abstraction. Logical stack 600 comprises components 610, 620, and 630 representing an infrastructure resource, an A platform, and a B platform, respectively. Within logical stack 600, B platform component 630 is within A platform component 620 indicating that B platform is supported by (e.g., hosted on, installed on, etc.) A platform. Furthermore within logical stack 600, A platform component 620 is within infrastructure component 610 indicating that A platform is supported by the infrastructure response. In an embodiment, a logical stack is a short hand representation of a base-stem graph, such as base-stem graph 500. The logical stack 600 indicates deployable configurations of the operating platforms without depicting the platform components. As such, a logical stack 600 can be represented to a user (e.g., displayed on a display device) as an easy to understand simplification of a more complex deployment. As such, the user can easily determine the platform and infrastructure dependencies without needing to specify the details of the components in the deployment.

Figure 7:
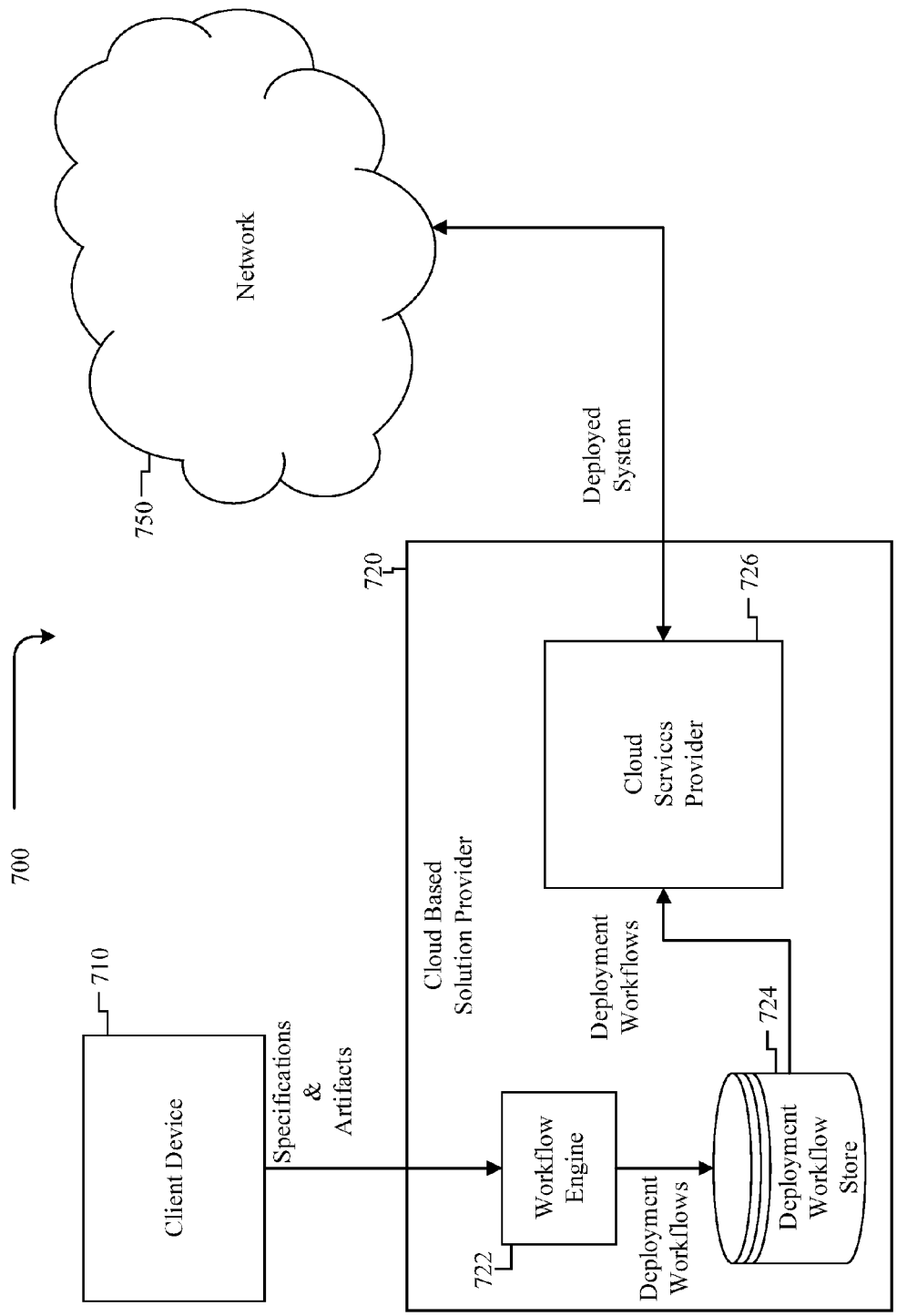
FIG. 7 is a schematic diagram of an embodiment of a cloud-based solution system.

FIG. 7 is a schematic diagram of an embodiment of a cloud-based solution system 700. Cloud-based solution system 700 comprises client device 710, cloud-based solution provider 720, and a network 750. The network 750 and the client device 710 of FIG. 7 may be similar to the network 190 and the host 195 of FIG. 1. Network 750 is substantially similar to network 190 and provides access to a deployed system(s) provider by cloud-based solution provider 720. In an embodiment, network 750 is the Internet. In some embodiments, network 750 is an internal or private network. Client device 710 may be any network device, such as host 195 and/or NE 200, that provides specifications and artifacts regarding a cloud-based solution to cloud-based solution provider 720. Cloud-based solution provider 720 is a service(s) and/or an application(s) that operate as a server or group of distributed servers, such as server 110, 115, and/or 119 and/or management node 130, within a data center(s), such as data center 180. Cloud-based solution provider 720 comprises workflow engine 722, deployment workflow store 724, and cloud services provider 726. Cloud-based solution provider 720 receives specifications and artifacts from client device 710 regarding a particular cloud-based deployment and provides the specified resources for the particular cloud-based solution via the connected network 750. Cloud-based solutions provider 720 may provide cloud-based services via either the IaaS, PaaS, or SaaS model.

Workflow engine 722 provides client device 710 a service to supply the cloud-based solution provider 720 specifications and artifacts to provision cloud computing resources for a particular cloud-based deployment to be hosted through the cloud-based solution provider 720. A specification provided by client device 710 to workflow engine 722 may describe the various components and/or services (e.g., platforms) and the relationships between the various platforms requested for the particular cloud-based solution. A specification may be submitted through a markup language such as a Topology and Orchestration Specification for Cloud Applications (TOSCA), Heat Orchestration Templates (HOT), YAML Ain't Markup Language (YAML), or any similar type mark-up language. A deployment model, such as deployment model 300, may be employed to represent a specification provided by client device 310.

Artifacts provided by client device 710 to workflow engine 722 include various configuration scripts to establish the relationship between the requested platforms as well as deployment files such as a Java Archive (JAR) or Web application Archive (WAR) file. Workflow engine 722 builds a series of workflows to deploy the requested computing resources and establish relationships between the computing resources for the particular cloud-based solution. In various embodiments, the workflows call a series of scripts, some of which may be provided by the client device 710, to initialize and launch the various requested computing resources. Workflow engine 722 provides the workflows to and stores the extracted workflows to deployment workflow store 724. Cloud services provider 726 obtains and runs the extracted workflows and corresponding scripts from the deployment workflow store 724 to deploy the various components requested for a particular cloud-based solution. The deployed computing resources are accessible though network 750 in order to provide the requested cloud-based solution to various client/user devices.

Figure 8:
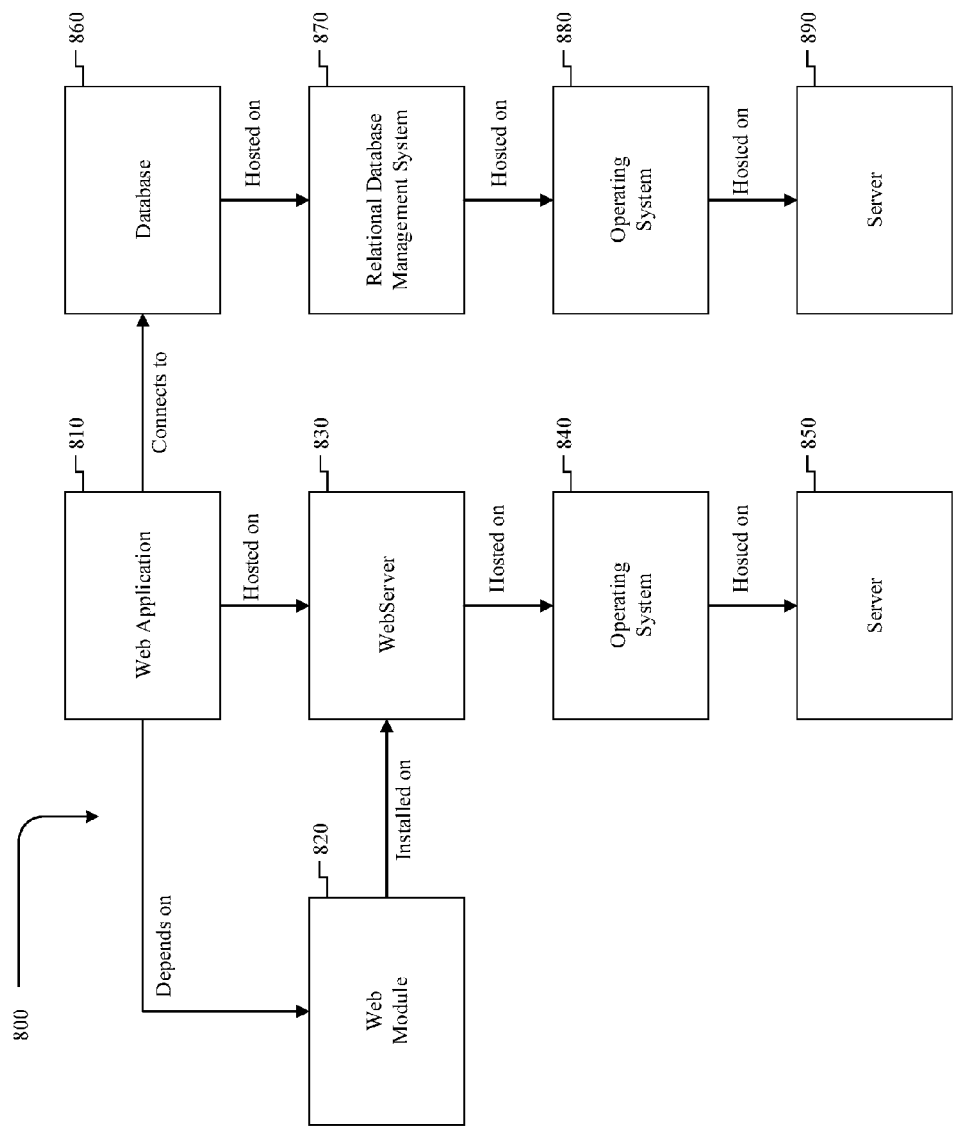
FIG. 8 is a schematic diagram of an embodiment of a deployment model defined within a specification file provided by a client device to a workflow engine in a cloud-based solution system.

FIG. 8 is a schematic diagram of an embodiment of a deployment model 800 defined within a specification file provided by a client device, such as client device 710, to a workflow engine, such as workflow engine 722, in a cloud-based solution system, such as cloud-based solution system 700. The deployment model 800 may be similar to the deployment model 300 of FIG. 3. The deployment model 800 comprises a web application 810, a web module 820, a webserver 830, a database 860, a relational database management system 870, and operating systems 840 and 880, which are operating on servers 850 and 890 as shown. A provided specification file defines the relationship between the requested cloud computing resources. The dependencies between the cloud computing resources are depicted as arrows, such that the component from which an arrow originates depends upon the component at which the arrow terminates. For example, web application 810 depends on web module 820. The dependencies may be defined by a script (e.g., artifact) that is provided by the provisioned of cloud-based system. Additionally, web application 810 is hosted on webserver 830 within the deployment model 800. Again, the initialization of web application 810 on webserver 830 is performed via another provided script. In a likewise manner, the relationships between the various components defined for deployment model 800 (e.g., web application 810, web module 820, webserver 830, database 860, relational database management system 870, operating systems 840 and 880, and server 850 and 890) are provided via the provided specification file. To state it another way, the provided specification file defines the requests components and then provides details (e.g., location) regarding the various scripts that are employed to establish a relationship (e.g., hosted on, depended upon, installed on, etc.) between the components.

Figure 9:
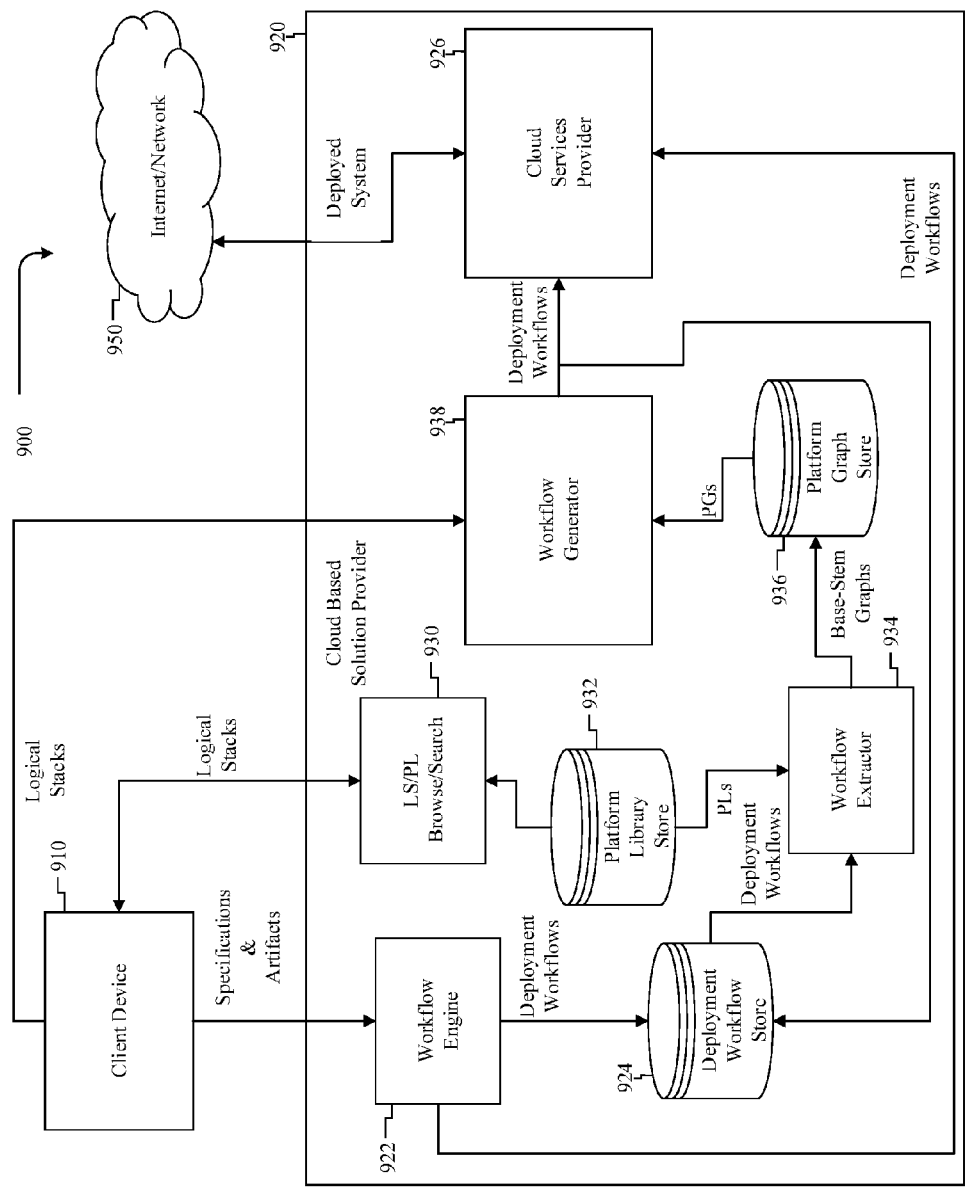
FIG. 9 is a schematic diagram of another embodiment of a cloud-based solution system.

FIG. 9 is a schematic diagram of an embodiment of a cloud-based solution system 900. Cloud-based solution system 900 is substantially similar to cloud-based solution system 700 and comprises client device 910, network 950, and cloud-based solution provider 920, which are substantially similar to client device 710, networks 750 and 190, and cloud-based solution provider 720, respectively. Cloud-based solution provider 920 comprises workflow engine 922, deployment workflow store 924, and cloud services provider 926, which are substantially similar to workflow engine 722, deployment workflow store 724, and cloud services provider 726, respectively. Additionally, cloud-based solution provider 920 comprises logical stack/platform library browse and search component 930, platform library store 932, workflow extractor 934, platform graph store 936, and workflow generator 938.

Similar to cloud-based solution system 700, client device 910 may provide workflow engine 922 with specifications and artifacts to provision cloud computing resources for a particular cloud-based solution to be hosted through the cloud-based solution provider 920. Workflow engine 922 builds a series of workflows to deploy the requested computing resources via cloud services provider 926 and stores the workflows to deployment workflow store 924.

The additional components of cloud-based solution provider 920, logical stack/platform library browse and search component 930, workflow extractor 934, and work flow generator 938 along with the supporting stores, platform library store 932 and platform graph store 936, provide client device 910 with additional service that allow client device 910 to provision cloud computing resources at a platform level without requiring the client device 910 to define the relationships between platform components through, for example, specification and artifacts.

In various embodiments, workflow extractor 934 extracts micro workflows from the deployment workflows stored in deployment workflow store 924. A micro-workflow is a type of workflow that describes deployment sequences for initiating components of a first platform with respect to components of a second platform, e.g., cross-platform dependent components in a layered platform deployment. In some embodiments, a micro-workflow may also describe deployment sequences for initiating a plurality of components for the same platform. The stored deployment workflows comprise deployment models, such as deployment model 300, regarding a platform configuration of one or more supported layered platforms. Workflow extractor 934 employs information from the platform library store and the stored deployment workflows to generate the micro-workflows. The workflow extractor 934 also constructs/maintains a platform graph for the supported layered platforms based on the extracted micro-workflows and corresponding platform libraries stored in platform library store 932. Micro-workflows are extracted by applying a disjoint removal rule and a context removal rule, as discussed below. Workflow extractor 934 also generates logical stacks from physical stacks based on the platform graph, which includes links between components in the same platform and cross-platform components. To construct a platform graph from a deployment workflow, the workflow extractor 934 iterates through intermediate deployment models generated by the workflow. The workflow extractor 934 first determines a logical stack for an intermediate deployment model based on the platform library store 932 using method 1100 as discussed below. The workflow extractor 934 then examines the differences between two adjacent logical stacks in the deployment workflow and extracts a micro-workflow that transforms the first logical stack to the second logical stack using workflow extraction rules such as the disjoint rule and the context rule. The logical stacks and the extracted micro-workflows are then added to the platform graph in the platform graph store 936.

Further, the workflow extractor 934 returns logic stacks for the user to browse via the platform library browse and search component 930. The workflow extractor 934 constructs base-stem graphs from the platform graph in the platform graph store 936. The base-stem graphs can be translated into logical stacks for each deployment model included in the deployment workflow store 924. Workflow extractor 934 queries the platform library store 932 to select platform libraries corresponding for various platforms and resources referenced in the selected deployment models. Workflow extractor 934 also references the minimum deployment requirements for various platforms and resources to determine a base-stem graph for the deployment model. To state another way, the workflow extractor 934 breaks a deployment workflow for a deployment model into micro-workflows for a set of logical stacks determined from the intermediate deployment models created by the deployment workflow.

In an embodiment, workflow extractor 934 determines a logical stack for an intermediate deployment model (e.g., physical stack) based on the following algorithm:

```
PS_to_LS(PS, PL)
    PS: physical stack
    PL: platform library
    BG: Base-Stem graph
    For each node X in Prefix Traversal of PS/tree
        Platform P = PL.lookup(X)
        if P in BG then continue else BG += P
            if X is child of node Y in PS/tree then
                platform Q = PL.lookup(Y)
                Link P to Q in BG
            if X links to node Y in PS/links then
                platform Q = PL.lookup(Y)
                Link Q to P in BG
    Base = platform linked to all other platforms
    Stem = the tree after removing the base
    return Base/Stem
```

Stated more generally, logical stack can be created from the physical stack by creating a base-stem graph with a minimum required deployment configuration by iterating through the physical stack. For each platform component (denoted as node X) in a physical stack, traverse the tree to select all child components and children of child components, etc. until a tree of all components dependent on X are selected. Then lookup the platform in the platform library for X and its children, and add such platform (denoted as P) to the base-stem graph. If the platform component X is a child node of a parent component (denoted as Y), then look up the platform for the parent node. If the parent node platform (denoted as Q) is a different platform than the child component platform, link the child component platform to the parent component platform in the base-stem graph. If the platform component node X links to platform component Y (e.g., X is a parent of Y or a bidirectional dependency, etc.), then link Y's platform Q to X's platform P. The resulting base-stem graph depicts all platform dependencies without depicting the corresponding components. The resulting base-stem graph (e.g., base-stem graph 500) can be converted to a logical stack representation (e.g., logical stack 600) for presentation to the client device 910.

Platform configurations (e.g., platform configurations 400) stored in platform library 932 contain minimum configurations for a corresponding supported platform. A platform configuration may be defined by a vendor of the corresponding platform or a system administrator. A platform library is accessible by the workflow extractor 934.

The platform library browse and search component 930 allows the client device 910 to browse and search platform configurations in platform library store 932. Through platform library browse and search component 930, client device 910 may combine the selected platforms into requested logical stacks. The requested logical stacks may be forwarded to the workflow extractor 934 and/or the workflow generator 938 to determine whether a set of workflows can be automatically generated to deploy a layered platform environment described by the user supplied logical stack.

Platform graph store 936 stores platform graphs regarding the various supported cloud-based platforms. In an embodiment, a platform graph comprises platform nodes that represent platforms, platform components, and infrastructure components. The platform graph also indicates links between the platform nodes to indicate dependencies and/or available micro-workflows to deploy one of the linked platforms/components relative to the other linked platforms/components.

Workflow generator 938 accepts logical stacks from client device 910 for a particular cloud-based solution to be hosted through the cloud-based solution provider 920. Workflow generator 938 generates a deployment workflow based on received logical stacks and the platform graphs stored in platform graph store 936. In an embodiment, workflow generator 938, queries the platform graph store 936 to find a best matching micro-workflow(s) to deploy each requested resource or platform in the manner specified by the requested logical stacks. Specifically, the workflow generator 938 examines the nodes of the logical stack in a specified order and searches the platform graph store 936 for the minimum number of micro-workflows to connect the nodes as described in method 1400. The generated deployment or coherent workflow is then distributed to a cloud services provider 926 and stored in deployment workflow store 924.

Cloud service provider 926 runs the generated workflows to deploy the various cloud computing resources requested for a particular cloud-based solution. The availability of the micro-workflows to complete the generated workflow can be signaled to the client device 910 prior to deployment. Accordingly, the user is made aware of whether a deployment will be successful prior to attempted deployment. When no micro-workflow can be found for a platform matching in the supplied logical stack, the results can be forwarded to the client device 910, and the client device 910 may supply a deployment model and any artifact necessary for deployment. The deployed computing resources are accessible though network 950 in order to provide the requested cloud-based solution to various end client/user devices.

In various embodiments, TOSCA may be employed by a client device, such as client devices 710 and 910, to represent a deployment model with a within a cloud-based solution system, such as cloud-based solution systems 900 and 700, by employing topology templates. TOSCA may be extended to include support for a logical stack representing cloud computing resource provisioned for a cloud-based solution. The extension defines a TOSCA relationship type LogicalStackType and defines logical stacks using TOSCA relationship_templates based on a LogicalStackType. The following is an example TOSCA markup that include the logical stack extension:

```
YAML definition for LogicalStackType relationship_types:
    LogicalStackType
        source: map
        target: map
YAML definition for logical stack P=I/M/K
relationship_templates:
    name=P:
        type: LogicalStackType
        source:
            name=I
            version=1.0
        target:
            comp2:
                type: LogicalStackType
                source:
                    name=M
                    version=2.0
                target:
                    name=K
                    version=3.0
```

Figure 10:
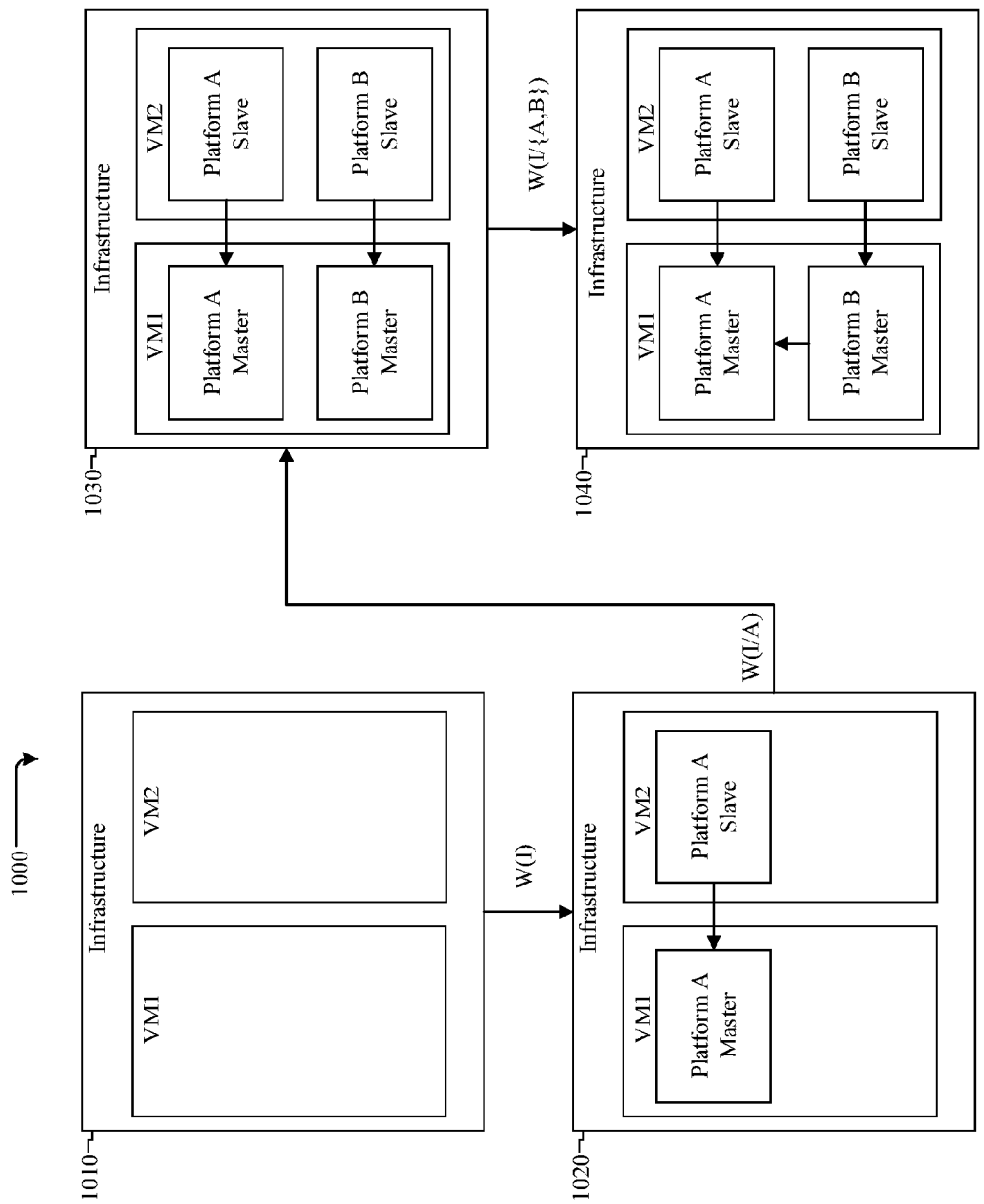
FIG. 10 is a schematic diagram of an example embodiment of a deployment workflow that may be executed by a cloud service provider.

FIG. 10 is a schematic diagram of an example embodiment of a deployment workflow 1000 that may be executed by a cloud service provider, such as cloud services providers 726 or 926. Deployment workflow 1000 comprises intermediate deployment models 1010, 1020, 1030, and 1040, which are similar to deployment model 300. Within deployment workflow 1000, the edges between intermediate deployment models 1010, 1020, 1030, and 1040 indicate an application of a micro-workflow. The direction of the arrow indicates the resulting deployment model once the corresponding micro-workflow is applied. The edge between deployment model 1010 and 1020 indicates that the micro-workflow W(I) transforms deployment model 1010 comprising an Infrastructure I to deployment model 1020 comprising A Platform over Infrastructure I/A. In a similar manner, the edges between deployment model 1020 and 1030 and between deployment model 1030 and 1040 indicate that the micro-workflow (W(I/A) or W(I/{A,B}), respectively) transforms the deployment model as indicated by the direction of the arrow. Accordingly, micro-workflows for various components of various platforms can be combined into a deployment workflow 1000 for a layered platform implementation. Further, platforms may comprise a master component and one or more slave components, which allows the components to easily scale out when large number of platform components are needed for a specified platform. As a particular example, platform A may comprise a Mesos platform and platform B may comprise a Kubernetes platform.

Figure 11:
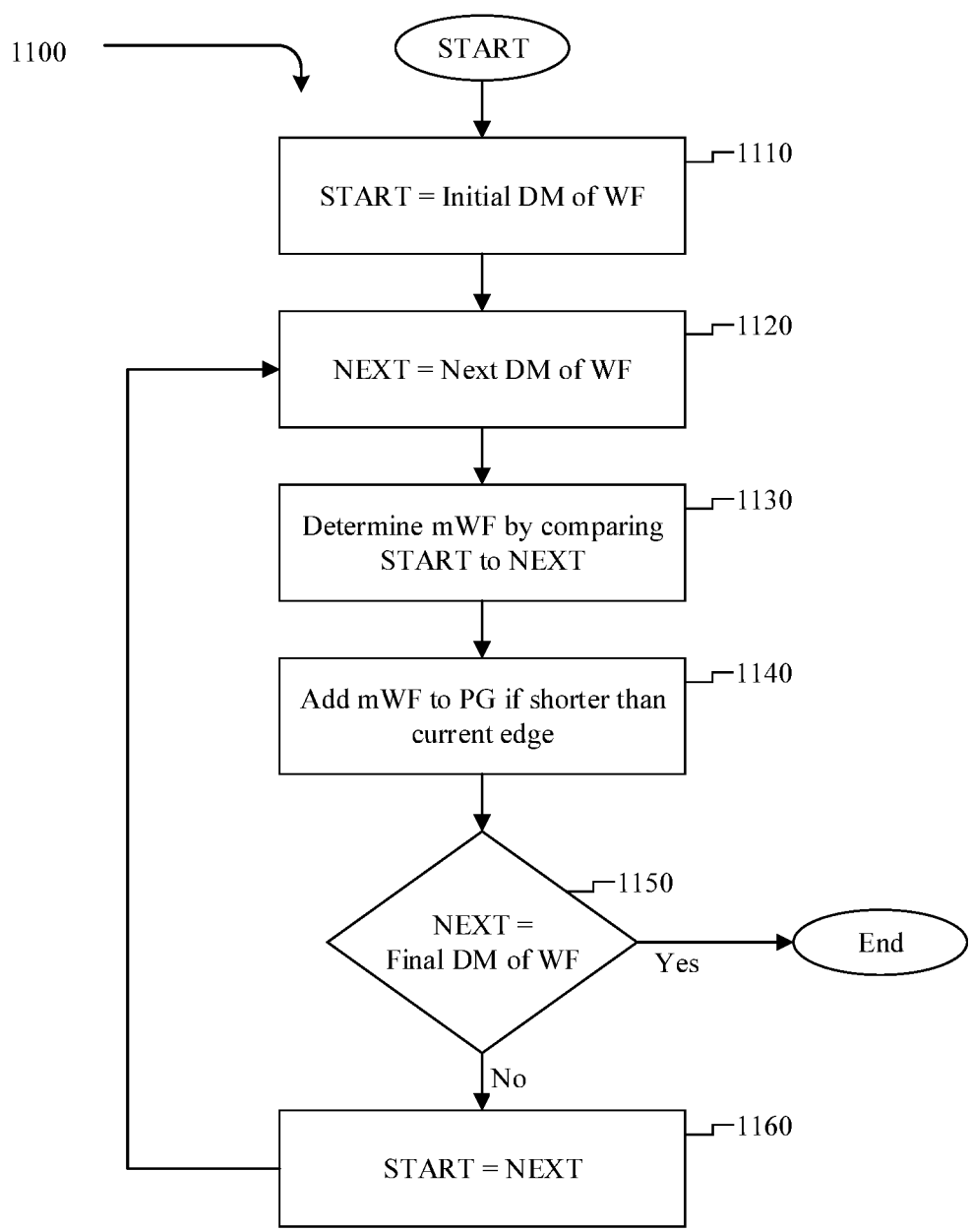
FIG. 11 is a flowchart of an embodiment of a method to extract micro-workflows from a deployment workflow, which may be implemented by a workflow generator within a cloud-based solution system.

FIG. 11 is a flowchart of an embodiment of a method 1100 to extract micro-workflows from a deployment workflow, such as deployment workflow 1000, which may be implemented by a workflow extractor, such as workflow extractor 934, within a cloud-based solution system, such as cloud-based solution systems 900 and 700. The method 1100 may be initiated when there is a desire to arrange platforms and infrastructure within a logical stack. At step 1110, the workflow extractor initializes a START object to an initial deployment model (DM) of a deployment workflow (WF), such as deployment workflow 1000. The START object is selected from a deployment workflow store, such as deployment workflow stores 724 and 924. At step 1120, the workflow extractor, initializes a NEXT object to a next deployment model from the deployment workflow. At step 1130, the workflow extractor determines a micro-workflow (mWF) by determining a difference between the logical stack derived from the START object with the logical stack derived from the NEXT object. The workflow extractor may determine the micro-workflow by directly extracting the micro-workflow based on the different between the logical stack derived from the START object with the logical stack derived from the NEXT object. Additionally, the workflow generator may determine the micro-workflow by applying a disjoint removal rule or a context removal rule on the logical stacks as discussed in methods 1200 and 1300, respectively. Directly extracting involves copying the workflow steps of the START object and the NEXT object. The disjoint removal rule involves copying the workflow steps between START and NEXT without those workflow steps related to a disjoint platform and may be represented by the following algorithm: "If Pi/{Pj, Pk}=W(Pi/Pj) match Pi/Pk Then Pi/Pk=W[−Pj](Pi, Pk)," where Pi represents platform data center infrastructure, Pj represents a first platform, Pk represents a second platform, and W represents a workflow, such that the platforms and infrastructure are arranged within a logical stack. The context removal rule involves copying the workflow steps between the START object and the NEXT object without those workflow steps related to a platform in a specified context. The context removal rule may be represented by the following algorithm, "If Pi/{Pj, Pk}=W(Pi/Pj/Pk) match Pj/Pk Then Pj/Pk=W[−Pi](Pj, Pk)," where Pi represents platform data center infrastructure, Pj represents a first platform, Pk represents a second platform, and W represents a workflow, such that the platforms and infrastructure are arranged within a logical stack.

At step 1140, the workflow extractor adds the determined micro-workflow to a platform graph (PG) store, such as platform graph store 936, when the determined micro-workflow is determined to be a more optimal workflow (e.g., with fewer steps) between the corresponding platforms than the current workflow between the corresponding platforms stored in the platform graph store. In other words, the platform extractor modifies the platform graph store if the determined workflow is new or is shorter than the existing workflow for the platforms. If the platform extractor determines the determined workflow represents a more optimal micro-workflow than the currently stored micro-workflow between platforms, the platform extractor then replaces the current micro-workflow with the determined micro-workflow in the platform graph store. At step 1150, when the NEXT object is not set to the final deployment model included in the deployment workflow, the process workflow extractor proceeds to step 1160. At step 1160, the workflow extractor sets the START object to the NEXT object and proceeds to step 1120. At step 1150, when the NEXT object is set to the final deployment model included in the deployment workflow, the process ends.

Figure 12:
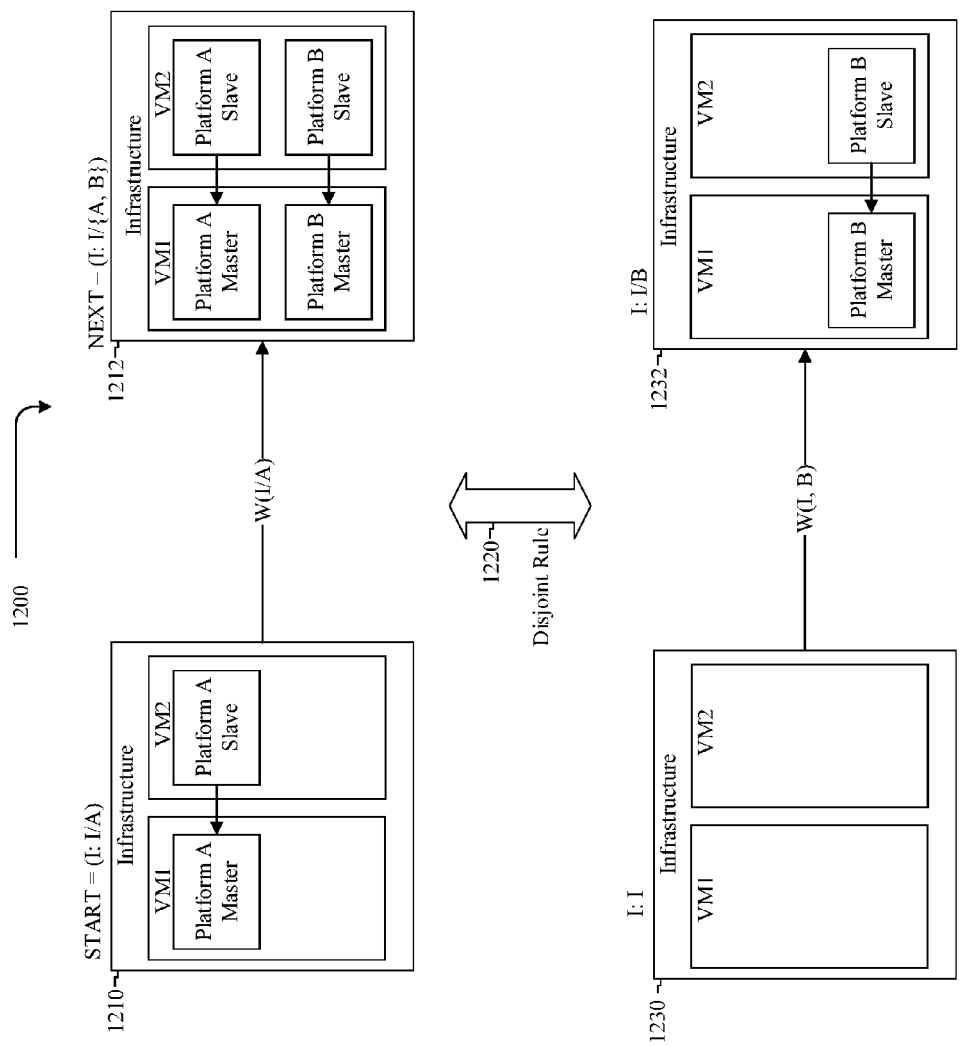
FIG. 12 is a schematic diagram of an example application of a disjoint rule by a workflow generator.

FIG. 12 is a schematic diagram of an example application 1200 of the disjoint rule, as described supra, by a workflow extractor, such as workflow extractor 934. Deployment model 1210 and deployment model 1212 may be extracted from a deployment workflow selected from a deployment workflow store, such as deployment workflow stores 724 and 924, by the workflow extractor in a process, such as the process described in FIG. 11. Deployment model 1210 may be set to the START object and deployment model 1212 may be set to the NEXT object as described in steps 1110 and 1120 of FIG. 11. The workflow extractor may apply the disjoint rule 1220 when comparing the START logical stack derived from deployment model 1210 to the NEXT logical stack derived from deployment model 1212 as described in step 1130 of FIG. 11 to determine the micro-workflow that represents the difference between the two logical stacks. In other words, the workflow extractor determines the micro-workflow that transforms the START logical stack derived from deployment model 1210 into the NEXT logical stack derived from deployment model 1212 through an application of the disjoint rule. Deployment models 1230 and 1232 represent the generalized logical stacks in which the extracted micro-workflow W(I, B) can deploy platform B on Infrastructure (I) without platform A. Compared to the logical stacks in deployment models 1210 and 1212, the logical stacks I and I/B in deployment models 1230 and 1232 do not contain platform A, which is irrelevant to platform B as no dependency exists between the components of platform A and the components of platform B. Accordingly, platform A is removed by the disjoint rule 1220 because no dependency exists between the components of platform B and the components of platform A.

Figure 13:
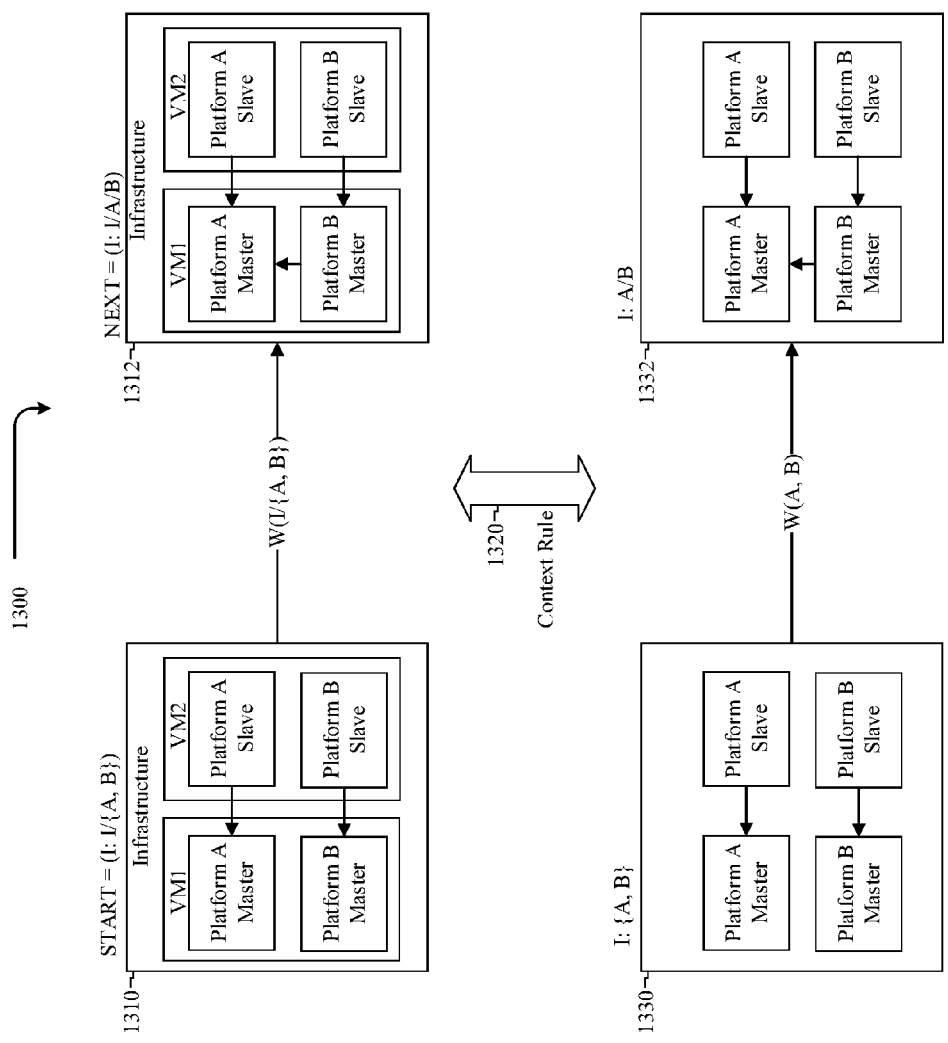
FIG. 13 is a schematic diagram of an example application of the context rule by a workflow generator.

FIG. 13 is a schematic diagram of an example application 1300 of the context rule, as described supra, by a workflow extractor, such as workflow extractor 934. Deployment model 1310 and deployment model 1312 may be extracted from a deployment workflow selected from a deployment workflow store, such as deployment workflow stores 724 and 924, by the workflow extractor in a process, such as the process described in FIG. 11. Deployment model 1310 may be set to the START object and deployment model 1312 may be set to the NEXT object as described in steps 1110 and 1120 of FIG. 11. The workflow extractor may apply the context rule 1320 when comparing the START logical stack derived from deployment model 1310 to the NEXT logical stack derived from deployment model 1312 as described in step 1130 of FIG. 11 to determine the micro-workflow that represents the difference between the two logical stacks. To state another way, the workflow extractor determines the micro-workflow that transforms the START logical stack derived from deployment model 1310 into the NEXT logical stack derived from deployment model 1312 through an application of the context rule 1320. Deployment models 1330 and 1332 represent the generalized logical stacks in which the extracted micro-workflow W(A, B) can deploy platform B to platform A after they are both deployed to Infrastructure (I). Compared to the logical stacks in deployment models 1310 and 1312, the logical stacks {A, B} and A/B in deployment models 1330 and 1332 do not contain links to specific infrastructure, which is generalized by the context rule 1320.

Figure 14:
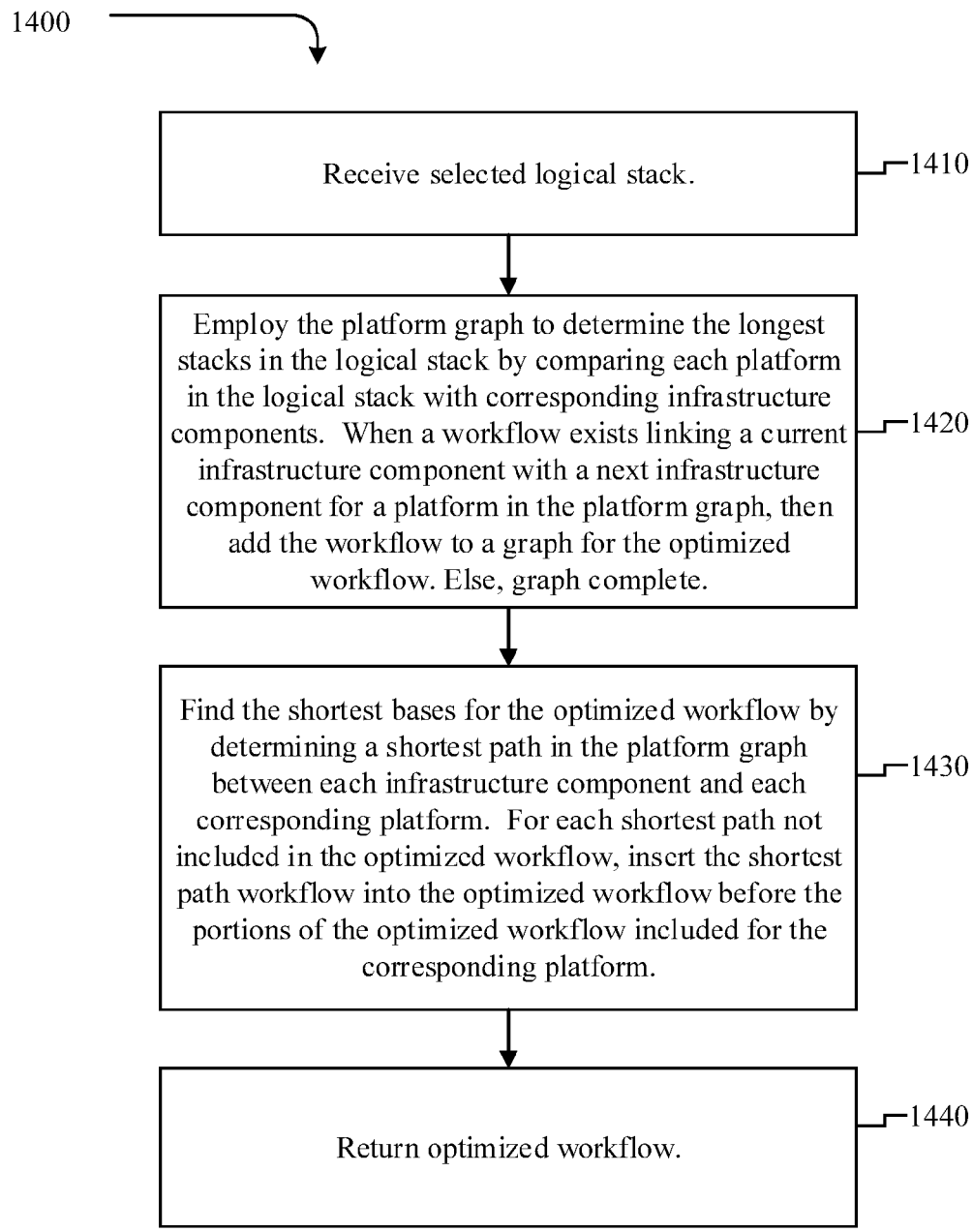
FIG. 14 is a flowchart of an embodiment of a method to determine a deployment workflow by a workflow generator based on logical stacks that represent a provisioning of cloud computing resources received from a client device.

FIG. 14 is a flowchart of an embodiment of a method 1400 to determine a deployment workflow by a workflow generator, such as workflow generator 938, based on logical stacks that represent a provisioning of cloud computing resource received from a client device, such as client devices 710 and 910. Method 1400 is initiated when a user browses for and selects a platform stack for deployment on data center infrastructure. At step 1410, the workflow generator receives a selected logical stack from a user. At step 1420, the workflow generator employs the platform graph to determine the largest number of consecutive platforms in the logical stack from left to right that can be deployed on each other by the micro-workflows in the platform graph. When an optimal workflow exists linking a current platform with a next platform in the platform graph, then the workflow to deploy the current platform on the next platform is added to the combined workflow. The above process repeats until all of the platform pairs are examined, resulting in an optimal combined workflow for deploying all the platforms on each other.

At step 1430, the workflow generator determines a shortest path of micro-workflows in the platform graph from each platform in the logical stack to the infrastructure in the logical stack. For each shortest path not included in the combined workflow, the shortest path workflow is inserted into the combined workflow before the portions of the combined workflow included for the corresponding platform. At step 1440, the combined workflow is returned, for example for storage in the platform graph store (e.g., platform graph store 936), to the deployment workflow store for storage (e.g., deployment workflow store 924), to a client device (e.g., client device 910) for approval prior to initiation of the optimized workflow, and/or to the cloud service provider (e.g., cloud services provider 926) for execution.

Figure 15:
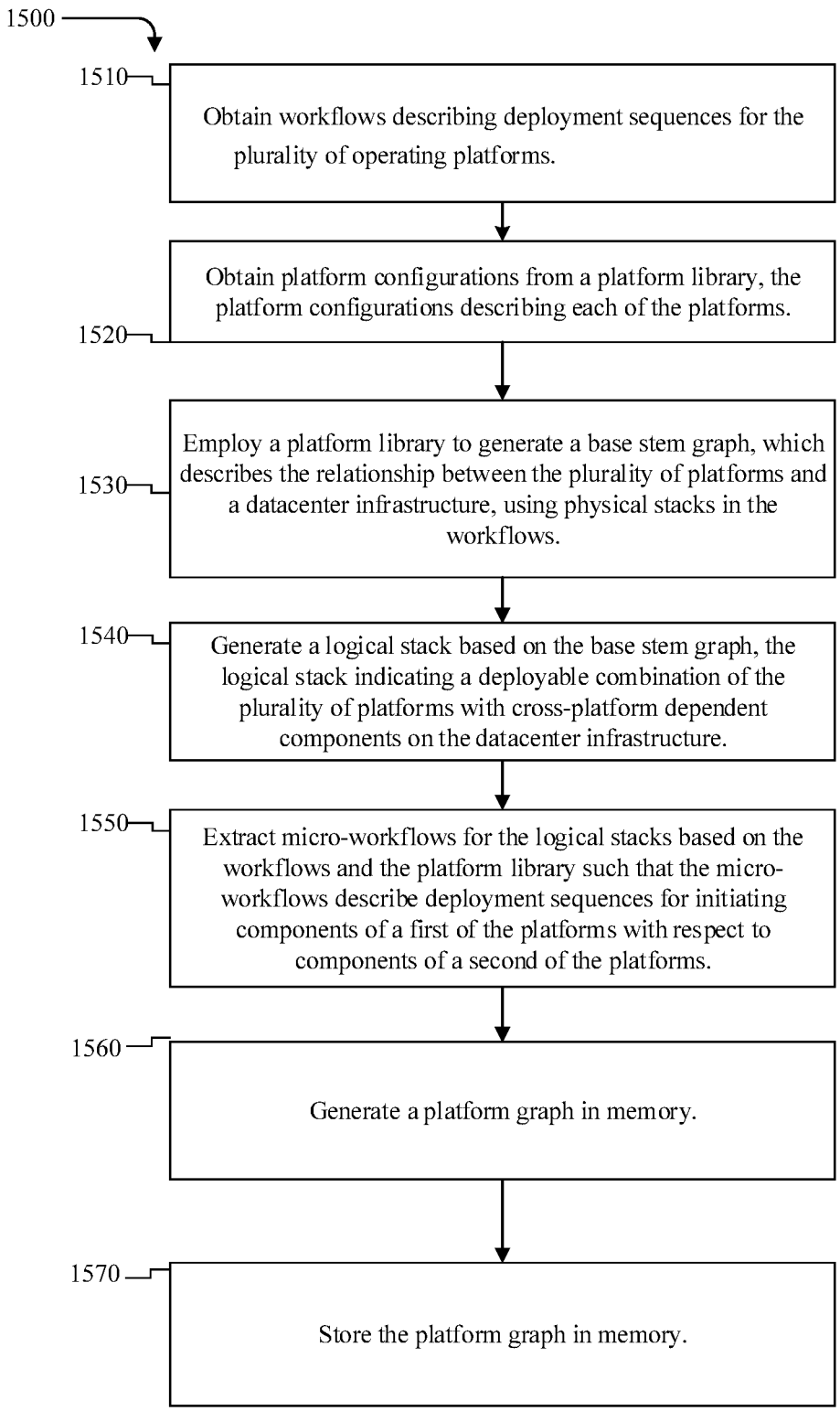
FIG. 15 is a flowchart of an exemplary embodiment of a method of generating logical stacks based on physical stacks within a cloud computing system.

FIG. 15 is a flowchart of an exemplary embodiment of a method 1500 of generating logical stacks based on physical stacks within a cloud computing system, such a cloud-based solution system 900. The method 1500 may be performed by, for example, the management node 130 of FIG. 1. Method 1500 is initiated when a management node, such as management node 130, in data center network, such as data center network 100, determines to generate logical stacks, such as logical stack 600, from physical stacks, such as deployment model 300, so that the logical stacks can be presented to a user for deployment of layered platform system without requiring the user to specify component dependencies. At step 1510, workflows are obtained from a deployment workflow store, such as deployment workflow store 924. The workflows describe deployment sequences for the plurality of operating platforms. At step 1520, platform configurations are obtained from a platform library, such as platform library store 932. The platform configurations describe each of the platforms and any corresponding configuration requirements, minimum component deployment requirements, etc.

At step 1530, a platform library is employed to generate a base stem graph, which describes the relationship between the plurality of platforms and a datacenter infrastructure, using physical stacks in the workflows. At step 1540, a logical stack may be generated based on the base-stem graph. The logical stack indicates a deployable combination of the plurality of platforms with cross-platform dependent components on the data center infrastructure. At 1550, micro-workflows are extracted for the logical stacks based on the workflows and the platform library. As such, the micro-workflows describe deployment sequences for initiating components of a first of the platforms with respect to components of a second of the platforms. At step 1560, a platform graph is generated based on the micro-workflows.

At step 1570, the platform graph is then stored in memory, for example in a platform graph store 936.

Figure 16:
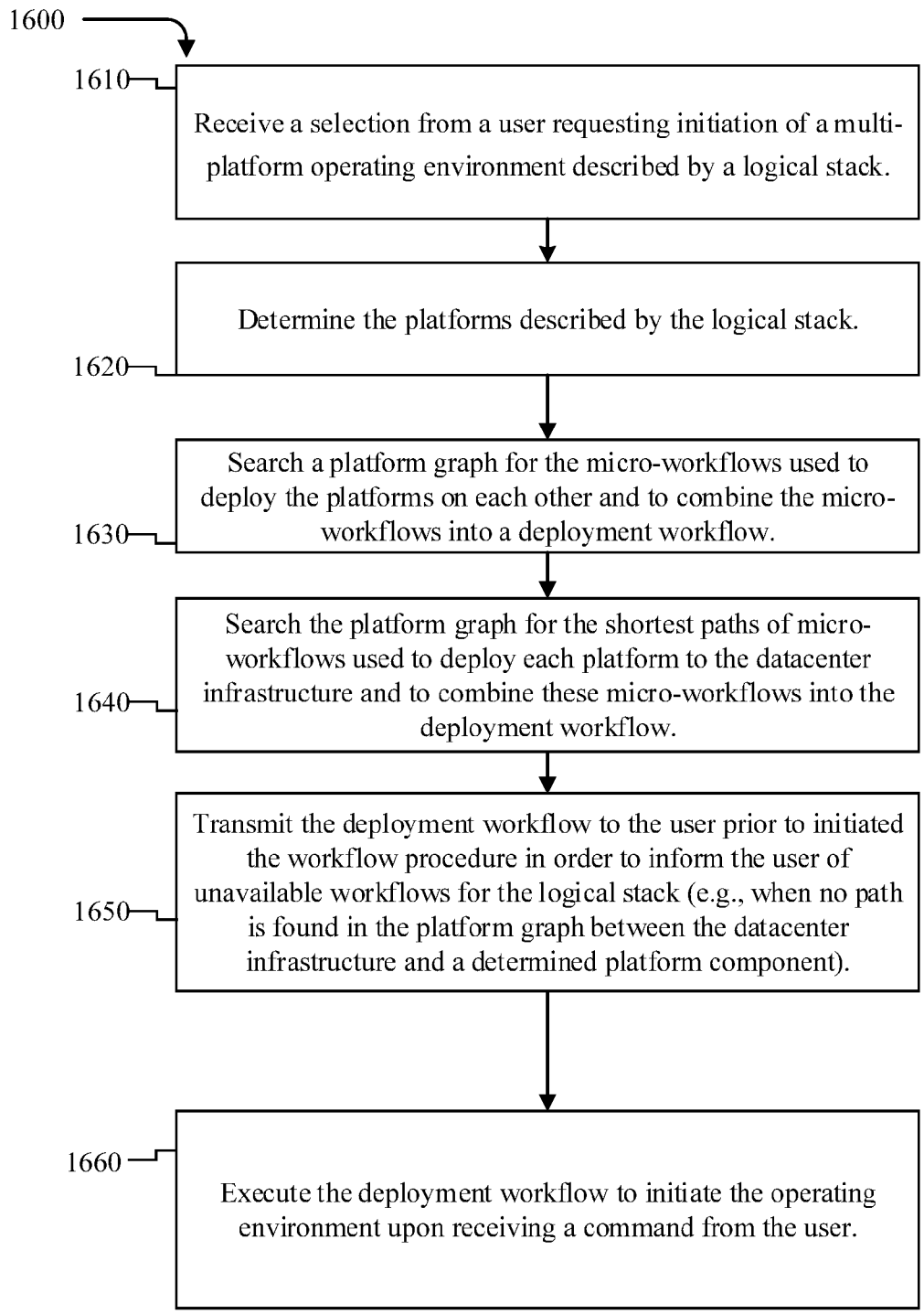
FIG. 16 is a flowchart of an exemplary embodiment of a method of generating workflows for a logical stack selection within a cloud computing system.

FIG. 16 is a flowchart of an exemplary embodiment of a method 1600 of generating workflows for a logical stack selection within a cloud computing system, for example as performed by a workflow generator, such as workflow generator 938, operating in a data center node, such as management node 130. Method 1600 is initiated when a workflow generator receives a query from a user to obtain a logical stack, such as logical stack 600, for deployment, for example as a physical stack, such as deployment model 300. At step 1610, a selection is received from a user requesting initiation of a multi-platform (e.g., layered platform) operating environment described by a logical stack. At step 1620, the platforms described by the logical stack are determined, for example according to method 1400. At step 1630, a platform graph is searched for the micro-workflows used to deploy the platforms on each other and to combine the micro-workflows into a deployment workflow. At step 1640, the platform graph is searched for the shortest paths of micro-workflows used to deploy each platform to the datacenter infrastructure and to combine these micro-workflows into the deployment workflow. At step 1650, the deployment workflow is transmitted to the user prior to initiated the workflow procedure in order to inform the user of unavailable workflows for the logical stack (e.g., when no path is found in the platform graph between the datacenter infrastructure and a determined platform component). At step 1660, the deployment workflow is executed to initiate the operating environment upon receiving a command from the user.

Figure 17:
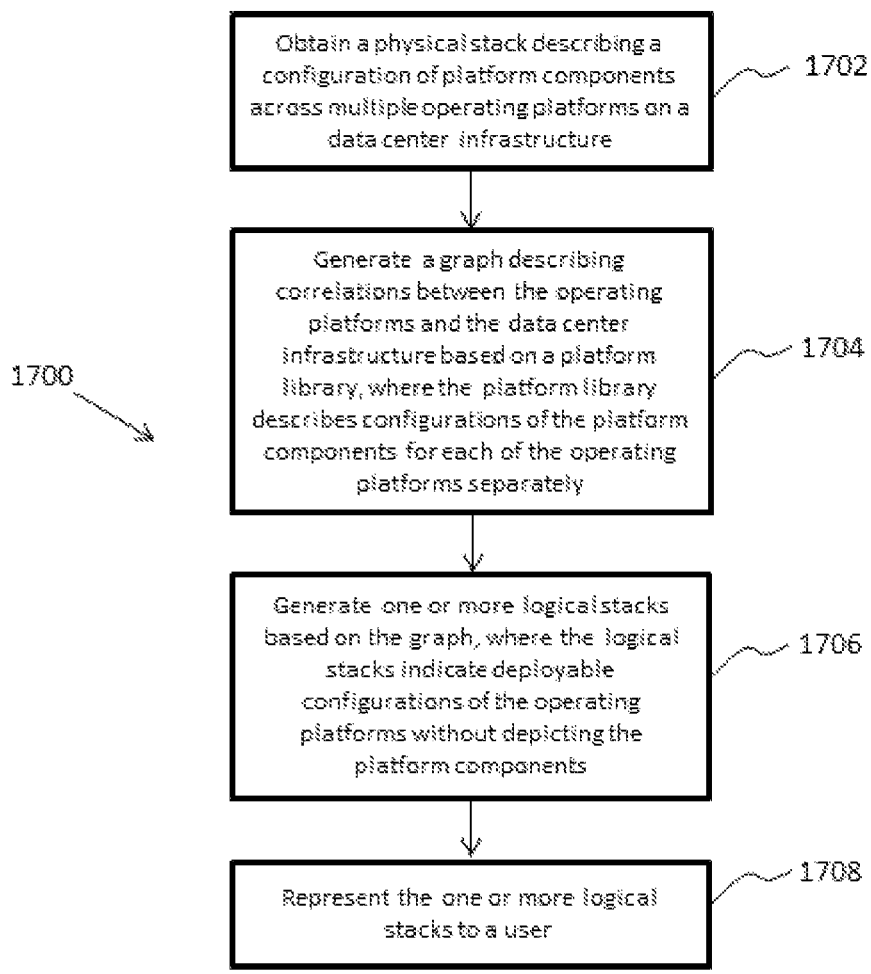
FIG. 17 is a flowchart of a method of representing a logic stack to a user.

FIG. 17 is a method 1700 implemented in a data center management node. The data center management node may be the management node 130 in FIG. 3. At block 1702, a physical stack describing a configuration of platform components across multiple operating platforms on a data center infrastructure is obtained from memory. The physical stack may be the deployment model 300 in FIG. 3, and the memory may be the memory 250 of FIG. 2. The configuration of platform components across multiple operating platforms may refer to, for example, the configuration of the infrastructure component 310, VM components VM1 320 and VM2 340, Platform A master component 322, Platform A slave component 342, Platform B master component 324, and Platform B slave component B 344 of FIG. 3. At block 1704, a graph describing correlations between the operating platforms and the data center infrastructure based on a platform library is generated by a processor. The graph may be the base stem graph 530 of FIG. 5, and platform libraries may be platform libraries 400 of FIG. 4. The platform library describes configurations of the platform components for each of the operating platforms separately. At block 1706, one or more logical stacks are generated by the processor based on the graph. The logical stacks may resemble, for example, the logical stack 600 of FIG. 6. The one or more logical stacks indicate deployable configurations of the operating platforms without depicting the platform components. At block 1708, the logic stack is represented to a user. For example, the logical stack may be displayed on a display device for the benefit of the user.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In an embodiment, a data center management node includes means for obtaining a physical stack describing a configuration of platform components across multiple operating platforms on a data center infrastructure, means for generating a graph describing correlations between the operating platforms and the data center infrastructure based on a platform library, wherein the platform library describes configurations of the platform components for each of the operating platforms separately, means for generating one or more logical stacks based on the graph, wherein the one or more logical stacks indicate deployable configurations of the operating platforms without depicting the platform components, and means for representing the logic stack to a user.

In an embodiment, a management node includes means for obtaining workflows from a memory, the workflows describing deployment sequences for a plurality of operating platforms in a data center, means for obtaining platform configurations from a platform library, wherein the platform configurations describes each of the platforms, means for extracting micro-workflows for the platforms based on the workflows and the platform configurations, wherein the micro-workflows describe deployment sequences for initiating components of a first of the platforms with respect to components of a second of the platforms, means for generating a platform graph based on the micro-workflows, and means for storing the platform graph, the workflows, and the platform library.

In an embodiment, a device includes means for receiving a selection from a user requesting initiation of a multi-platform operating environment described by a logical stack, generating a workflow procedure to initiate platform components on a data center infrastructure for each platform described in the logical stack by determining the platforms described by the logical stack, searching a platform graph to determine the platform components required for each platform in the logical stack, and searching the platform graph for shortest paths between the data center infrastructure and each of the determined platform component, and means for transmitting the generated workflow procedure to the user.

In an embodiment, a workflow generator includes means for receiving a selected logical stack from a user, means for employing the platform graph to determine the longest stacks in the logical stack by comparing each platform in the logical stack with corresponding infrastructure components, means for adding, when a workflow exists linking a current infrastructure component with a next infrastructure component for a platform in the platform graph, a workflow to deploy the current infrastructure with respect to the next infrastructure to a graph representing an optimized workflow, means for repeating the above process until all of the platform pairs are examined, resulting in an end to the graph for the optimized workflow, means for finding the shortest bases for the optimized workflow by determining a shortest path in the platform graph between each infrastructure component and each corresponding platform, wherein for each shortest path not included in the optimized workflow, the shortest path workflow is inserted into the optimized workflow before the portions of the optimized workflow included for the corresponding platform, means for returning the optimized workflow.

In an embodiment, a management node includes means for obtaining workflows from a deployment workflow store, means for obtaining platform configurations from a platform library, means for extracting micro-workflows for the platforms based on the deployment workflows and the platform configurations from the platform library, means for generating a platform graph based on the micro-workflows, means for storing the platform graph in memory, means for generating a base-stem graph using the platform graph and a physical stack, and means for generating a logical stack based on the base-stem graph.

In an embodiment, a workflow generator including means for receiving a query from a user to obtain a logical stack, means for receiving a selection from a user requesting initiation of a multi-platform operating environment described by a logical stack, means for determining the platforms described by the logical stack, means for searching a platform graph to determine platform components required for each platform in the logical stack, means for searching the platform graph for shortest paths between the data center infrastructure and each determined platform component to generate an optimized workflow procedure, means for transmitting the generated workflow procedure to the user prior to initiating the generated workflow procedure in order to inform the user of unavailable workflows for the logical stack, and means for executing the generated workflow procedure to initiate the operating environment upon receiving a command from the user.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a data center management node, the method comprising:
    obtaining, from memory, a physical stack describing a configuration of platform components across multiple operating platforms on a data center infrastructure;
    generating, by a processor, a graph describing correlations between the operating platforms and the data center infrastructure based on a platform library, wherein the platform library describes configurations of the platform components for each of the operating platforms separately;
    generating, by the processor, one or more logical stacks based on the graph, wherein the one or more logical stacks indicate deployable configurations of the operating platforms without depicting the platform components; and
    representing the logic stack to a user.

2. The method of claim 1, wherein generating the graph comprises:
    obtaining platform configurations for platforms corresponding to platform components in the physical stack;
    generating, for the graph, a platform node corresponding to a platform whose components are in the physical stack; and
    returning the graph without returning corresponding platform components.

3. The method of claim 2, wherein generating the graph further comprises linking platform nodes based on the links between the platform components in the physical stack.

4. The method of claim 1, further comprising:
obtaining workflows describing deployment sequences for the plurality of operating platforms;
obtaining platform configurations from the platform library, the platform configurations describing the components and their relations of each of the platforms;
extracting micro-workflows for the platforms based on the workflows and the platform configurations, wherein the micro-workflows describe deployment sequences for initiating components of a first of the platforms with respect to components of a second of the platforms;
generating the platform library based on the micro-workflows; and
storing the platform library in memory.

5. The method of claim 4, wherein extracting the micro-workflows comprises:
extracting a first workflow to initiate a first platform component on the data center infrastructure;
extracting a second workflow to initiate a second platform component on the data center infrastructure;
extracting a third workflow to link the first platform component to the second platform component; and
combining the first workflow, second workflow, and third workflow into at least one of the micro-workflows.

6. The method of claim 5, wherein the second workflow is extracted by applying a disjoint removal rule, and wherein the disjoint removal rule requires removal of workflow steps related to disjoint platforms.

7. The method of claim 5, wherein the third workflow is extracted by applying a context removal rule, and wherein the context removal rule requires employing each workflow step associated with the first platform and the second platform and not related to a specified context.

8. The method of claim 1, further comprising:
receiving, via a receiver, a selection from a user requesting deployment of a multi-platform operating environment described by the logical stack; and
generating a workflow procedure to deploy components on the data center infrastructure for each platform described in the logical stack.

9. The method of claim 8, further comprising transmitting, via a transmitter, the workflow procedure to the user prior to executing the workflow procedure in order to inform a user of unavailable workflows for the logical stack, wherein the unavailable workflows are determined when no path is found in the platform library between the data center infrastructure and a determined platform component.

10. The method of claim 8, wherein generating the workflow procedure comprises:
determining the platforms described by the logical stack;
searching a platform graph to determine shortest workflows required for deploying the platforms on each other in the logical stack; and
searching the platform graph for shortest workflows required for deploying each platform on the data center infrastructure.

11. The method of claim 1, wherein each platform employs a master component and at least one slave component.

12. The method of claim 11, wherein the platforms comprise Kubernetes and Mesos platforms, and wherein the graph comprises a base-stem graph.

13. A method comprising:
receiving, via a receiver, a selection from a user requesting deployment of a multi-platform operating environment described by a logical stack;
generating, via a processor, a workflow procedure to deploy platform components on a data center infrastructure for each platform described in the logical stack by:
determining the platforms described by the logical stack;
searching a platform graph to determine shortest workflows required for deploying the platforms on each other in the logical stack; and
searching the platform graph for shortest workflows required for deploying the platforms on the data center infrastructure; and
transmitting, via a transmitter, the workflow procedure to the user.

14. The method of claim 13, wherein extracting micro-workflows comprises:
extracting a first workflow to initiate a first platform component on the data center infrastructure;
extracting a second workflow to initiate a second platform component on the data center infrastructure;
extracting a third workflow to link the first platform component to the second platform component; and
combining the first workflow, second workflow, and third workflow into at least one of the micro-workflows.

15. The method of claim 14, wherein the second workflow is extracted by applying a disjoint removal rule, and wherein the disjoint removal rule requires removal of workflow steps related to disjoint platforms.

16. The method of claim 14, wherein the third workflow is extracted by applying a context removal rule, and wherein the context removal rule requires employing each workflow step associated with the first platform and the second platform and not related to a specified context.

17. A method comprising:
receiving, via a receiver, a selection from a user requesting deployment of a multi-platform operating environment described by a logical stack;
generating, via a processor, a workflow procedure to deploy platform components on a data center infrastructure for each platform described in the logical stack by:
determining the platforms described by the logical stack;
searching a platform graph to determine shortest workflows required for deploying the platforms on each other in the logical stack; and
searching the platform graph for shortest workflows required for deploying the platforms on the data center infrastructure; and
transmitting, via a transmitter, the workflow procedure to the user.

18. The method of claim 17, further comprising transmitting, via a transmitter, the workflow procedure to the user prior to executing the workflow procedure in order to inform a user of unavailable workflows for the logical stack, wherein the unavailable workflows are determined when no path is found in the platform graph between the data center infrastructure and a determined platform component.

19. The method of claim 17, wherein each platform employs a master component and at least one slave component.

20. The method of claim 19, wherein the platforms comprise Kubernetes and Mesos platforms.

* * * * *